(12) United States Patent
Denise

(10) Patent No.: US 8,286,085 B1
(45) Date of Patent: Oct. 9, 2012

(54) ATTACHMENT SUGGESTION TECHNOLOGY

(76) Inventor: Jason Adam Denise, Bowie, MD (US)

(*) Notice: Subject to any disclaimer, the term of this patent is extended or adjusted under 35 U.S.C. 154(b) by 647 days.

(21) Appl. No.: 12/573,151

(22) Filed: Oct. 4, 2009

(51) Int. Cl.
*G06F 3/00* (2006.01)
*G06F 3/048* (2006.01)
*G06F 15/16* (2006.01)
*G06F 7/00* (2006.01)

(52) U.S. Cl. ......... 715/752; 715/780; 709/204; 707/705
(58) Field of Classification Search .................. 715/752, 715/780; 709/204; 707/705
See application file for complete search history.

(56) References Cited

U.S. PATENT DOCUMENTS

| | | | |
|---|---|---|---|
| 5,384,832 A | 1/1995 | Zimmerman et al. | |
| 5,818,447 A | 10/1998 | Wolf et al. | |
| 5,878,230 A | 3/1999 | Weber et al. | |
| 5,892,909 A | 4/1999 | Grasso et al. | |
| 5,920,576 A | 7/1999 | Eaton et al. | |
| 6,002,763 A | 12/1999 | Lester et al. | |
| 6,040,781 A | 3/2000 | Murray | |
| 6,073,133 A | 6/2000 | Chrabaszcz | |
| 6,073,142 A | 6/2000 | Geiger et al. | |
| 6,092,114 A | 7/2000 | Shaffer et al. | |
| 6,108,688 A | 8/2000 | Nielsen | |
| 6,122,353 A | 9/2000 | Brady et al. | |
| 6,185,603 B1 | 2/2001 | Henderson et al. | |
| 6,212,553 B1 | 4/2001 | Lee et al. | |
| 6,253,075 B1 | 6/2001 | Beghtol et al. | |
| 6,272,532 B1 | 8/2001 | Feinleib | |
| 6,317,488 B1 | 11/2001 | DePond et al. | |
| 6,317,788 B1 | 11/2001 | Richardson | |
| 6,353,778 B1 | 3/2002 | Brown | |
| 6,396,497 B1 | 5/2002 | Reichlen | |
| 6,408,177 B1 | 6/2002 | Parikh et al. | |
| 6,449,492 B1 | 9/2002 | Kenagy et al. | |
| 6,519,335 B1 | 2/2003 | Bushnell | |
| 6,565,608 B1 | 5/2003 | Fein et al. | |
| 6,647,108 B1 | 11/2003 | Wurster et al. | |
| 6,671,718 B1 | 12/2003 | Meister et al. | |
| 6,687,745 B1 | 2/2004 | Franco et al. | |
| 6,697,824 B1 | 2/2004 | Bowman-Amuah | |
| 6,751,485 B2 | 6/2004 | Ranta | |
| 6,760,727 B1 | 7/2004 | Schroeder et al. | |
| 6,799,163 B2 | 9/2004 | Nolan | |
| 6,816,885 B1 | 11/2004 | Raghunandan | |
| 6,823,368 B1 | 11/2004 | Ullmann et al. | |
| 6,829,348 B1 | 12/2004 | Schroeder et al. | |
| 6,859,213 B1 | 2/2005 | Carter | |
| 6,871,214 B2 | 3/2005 | Parsons et al. | |
| 6,912,564 B1 | 6/2005 | Appelman et al. | |
| 6,968,364 B1 | 11/2005 | Wong et al. | |
| 6,970,908 B1 | 11/2005 | Larky et al. | |
| 7,007,066 B1 | 2/2006 | Malik | |
| 7,054,905 B1 | 5/2006 | Hanna et al. | |
| 7,092,743 B2 | 8/2006 | Vegh | |
| 7,107,276 B2 | 9/2006 | Johnson | |
| 7,120,278 B2 | 10/2006 | Sukegawa et al. | |
| 7,209,953 B2 | 4/2007 | Brooks | |

(Continued)

*Primary Examiner* — Ting Lee

(57) ABSTRACT

Techniques are described for providing attachment suggestions for electronic communications. For instance, text entered in an interface defining an outgoing communication is compared with file storage information. Based on the comparison, an attachment suggestion is determined for the outgoing communication and a representation of the determined attachment suggestion is displayed. The attachment suggestion may include a suggested folder location from which to attach a file and/or a suggested file to attach.

20 Claims, 30 Drawing Sheets

U.S. PATENT DOCUMENTS

| | | |
|---|---|---|
| 7,231,426 B1 | 6/2007 | Hall et al. |
| 7,233,229 B2 | 6/2007 | Stroupe et al. |
| 7,257,639 B1 | 8/2007 | Li et al. |
| 2001/0034769 A1 | 10/2001 | Rast |
| 2003/0182323 A1 | 9/2003 | Demsky et al. |
| 2004/0054737 A1 | 3/2004 | Daniell |
| 2004/0068545 A1 | 4/2004 | Daniell et al. |
| 2004/0083191 A1 | 4/2004 | Ronnewinkel et al. |
| 2004/0103162 A1 | 5/2004 | Meister et al. |
| 2004/0114747 A1 | 6/2004 | Trandal et al. |
| 2004/0128357 A1 | 7/2004 | Giles et al. |
| 2004/0143596 A1 | 7/2004 | Gross et al. |
| 2004/0158607 A1 | 8/2004 | Coppinger et al. |
| 2004/0220925 A1 | 11/2004 | Liu et al. |
| 2004/0249890 A1 | 12/2004 | Fellenstein et al. |
| 2005/0076085 A1 | 4/2005 | Budd et al. |
| 2005/0108336 A1 | 5/2005 | Naick et al. |
| 2005/0132066 A1 | 6/2005 | Heilmann |
| 2005/0197138 A1 | 9/2005 | Kaminsky et al. |
| 2005/0228774 A1 | 10/2005 | Ronnewinkel |
| 2005/0228790 A1 | 10/2005 | Ronnewinkel et al. |
| 2005/0229150 A1 | 10/2005 | Ronnewinkel |
| 2006/0012563 A1 | 1/2006 | Fyke et al. |
| 2006/0031309 A1 | 2/2006 | Luoffo et al. |
| 2006/0031310 A1 | 2/2006 | Lee |
| 2006/0046694 A1 | 3/2006 | Yu |
| 2006/0075228 A1 | 4/2006 | Black et al. |
| 2006/0089972 A1 | 4/2006 | Malik |
| 2006/0126806 A1 | 6/2006 | Trandal et al. |
| 2006/0133590 A1 | 6/2006 | Jiang |
| 2006/0149819 A1 | 7/2006 | Auhagen |
| 2006/0150088 A1 | 7/2006 | Kraft et al. |
| 2006/0168065 A1 | 7/2006 | Martin |
| 2006/0184584 A1 | 8/2006 | Dunn et al. |
| 2006/0248579 A1 | 11/2006 | Gerritsen et al. |
| 2006/0259556 A1 | 11/2006 | Auhagen |
| 2006/0282575 A1 | 12/2006 | Schultz et al. |
| 2007/0001820 A1 | 1/2007 | Luo |
| 2007/0032225 A1 | 2/2007 | Konicek et al. |
| 2007/0037605 A1 | 2/2007 | Logan |
| 2007/0072616 A1 | 3/2007 | Irani |
| 2007/0094217 A1 | 4/2007 | Ronnewinkel |
| 2007/0130369 A1 | 6/2007 | Nayak |
| 2007/0143425 A1 | 6/2007 | Kieselbach et al. |
| 2007/0188465 A1 | 8/2007 | Lee et al. |
| 2007/0250585 A1 | 10/2007 | Ly et al. |
| 2007/0259685 A1 | 11/2007 | Engblom et al. |
| 2007/0271345 A1 | 11/2007 | Callanan et al. |
| 2007/0288575 A1 | 12/2007 | Gillum et al. |
| 2008/0036623 A1 | 2/2008 | Rosen |
| 2008/0057926 A1 | 3/2008 | Forstall et al. |
| 2008/0132290 A1 | 6/2008 | Sharabi et al. |
| 2008/0137913 A1 | 6/2008 | Hildreth |
| 2009/0248615 A1* | 10/2009 | Drory et al. ............ 707/2 |

* cited by examiner

|  | SEND — 150 | ATTACH — 160 |
|---|---|---|
| TO (110) | user1@company1.com | |
| CC (120) | user2@company2.com | |
| SUBJECT (130) | Third Quarter Report | |
| (140) Dear User1,<br><br>Please find attached a copy of report X for widget production. If you have any questions, please let me know.<br><br>Thanks,<br>Jason | | |

| Suggested Files | |
|---|---|
| Company 1 -> Widget Production -> Report X_Third Quarter.doc | Attach |
| Company 1 -> Widget Production -> Report X-Third Quarter.doc | Attach |
| Company 2 -> Widget Production -> Report X_Third Quarter.doc | Attach |
| Company 1 -> Widget Production -> Report X Third Quarter.doc | Attach |

194

| Suggested Folders | |
|---|---|
| Company 1 -> Widget Production | Browse |
| Company 2 -> Widget Production | Browse |
| Company 1 -> Widget Sales | Browse |
| Company 3 -> Widget Production | Browse |
| Company 2 -> Widget Sales | Browse |
| Company 1 -> General | Browse |
| Company 3 -> Widget Sales | Browse |
| Company 2 -> General | Browse |

110
120
130

140

Dear User1,

Please find attached a copy of report X for widget production. If you have any questions, please let me know.

Thanks,
Jason

Fig. 1C

| | SEND | ATTACH |
|---|---|---|
| TO | coworker@isp.com | |
| CC | | |
| SUBJECT | FWD: Report Request | |

Attached is a draft of the below-referenced report for your review.

Thanks,
Jason

---

From:   user1@company1.com   ─ 812
Sent:  August 1, 2009 1:00 PM
To: jason@company.com
Subject:   Report Request When can I expect a draft Report for Project B? ─ 814

1400

| | SEND | ATTACH |
|---|---|---|
| TO | coworker@isp.com | |
| CC | | |
| SUBJECT | Sample | |

Dear Coworker,

Please find attached a copy of [Company 2 Project X Report 2] ─ 1410

ATTACH: Company 2-> Project X-> Report 2.doc ─ 1420
1422 ─ [Yes]   [No] ─ 1424

Fig. 14

|  | 2110 | 2120 | 2130 | 2140 |
|---|---|---|---|---|
|  | Folder | Attach Rate | Recipient(s) | Attachment Date/Time |
| 2150 | Mirrored Backup | 0% | N/A | N/A |
| 2152 | Temp. Internet Files | 0% | N/A | N/A |
| 2154 | Deleted Items | 0% | N/A | N/A |
| 2156 | Autorecovery | 0% | N/A | N/A |
| 2158 | Company 1 | 40% | User 1 | Monday – Friday; 8 AM – 6 PM |
| 2160 | Company 2 | 30% | User 2 | No Pattern |
| 2162 | Project A | 20% | User A & B | No Pattern |
| 2164 | Project Z | 10% | User Group Z | Saturday, Sunday |

ATTACHMENT SUGGESTION TECHNOLOGY

FIELD

This document relates to attachment suggestion technology.

BACKGROUND

Electronic communication devices may be configured to send electronic communications. Users may attach files to electronic communications sent using the electronic communication devices.

SUMMARY

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIGS. 1A-1C, 4, 5, 7, 8, 10, 12, 14, 16, 17, 19, 22, 24, 26, and 28 illustrate example diagrams.

FIG. 21 illustrates an example data structure.

DETAILED DESCRIPTION

Techniques are described for providing suggestions related to attaching items (e.g., files) to electronic communications. In electronic communication systems, it often takes time to locate a desired file to attach to an electronic communication, particularly when a storage device that stores the file has a complicated directory structure that includes many folders and subfolders. To reduce the time needed to locate a file to attach to an electronic communication, an electronic communication system includes an enhanced attachment suggestion mechanism that scans content of a draft electronic communication, compares the content of the draft electronic communication to file storage information (e.g., folder names and file names in a directory structure), and provides an attachment suggestion based on the comparison. The attachment suggestion may include a file with a file name that matches content included in the draft electronic communication or a folder with folder name that matches content included in the draft electronic communication. Providing the attachment suggestion may assist a user in navigating a directory structure in finding a file to attach and may reduce an amount of time a user spends trying to locate a desired file to attach to a draft electronic communication.

Figure 1B:
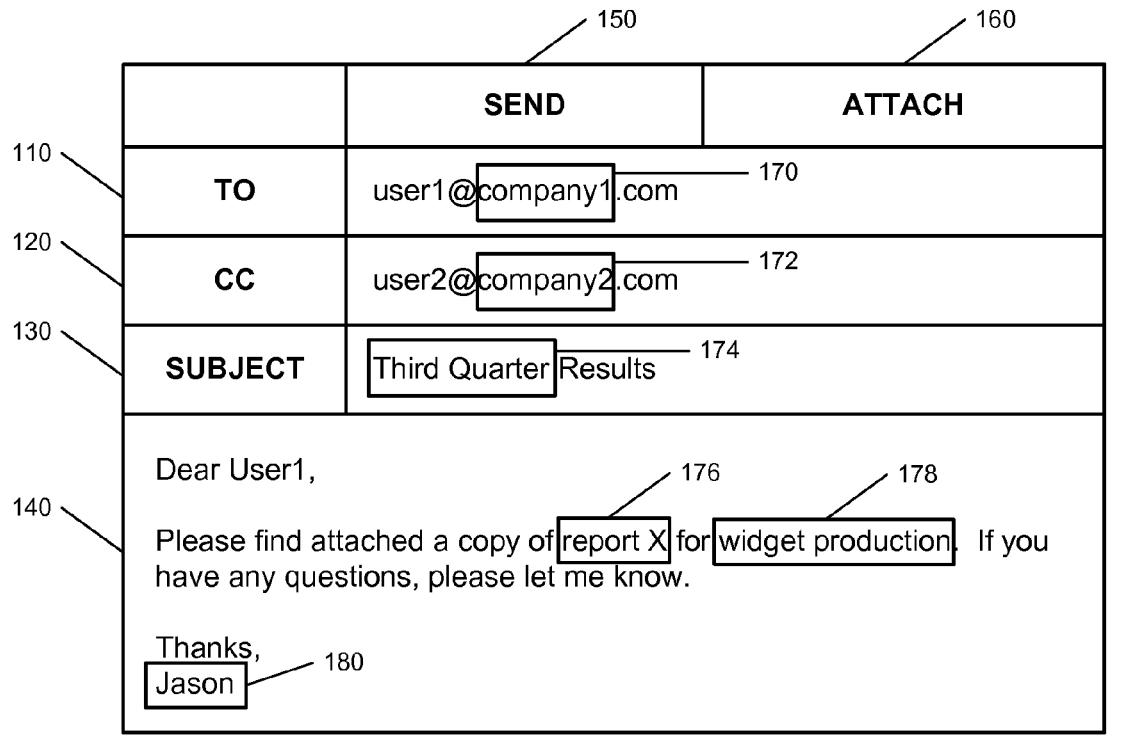

FIGS. 1A to 1C illustrate an example of suggesting an attachment for an electronic communication (e.g., an electronic mail message). FIG. 1A shows an example communication interface of a draft electronic communication. The communication interface includes a "To" field 110, a "CC" field 120, a subject field 130, a body field 140, a send control 150, and an attach control 160. The "To" field 110 is an input field that receives input to define an address of a recipient of the electronic communication. The "CC" field 120 is an input field that receives input to define an address of a recipient copied on the electronic communication. The subject field 130 is an input field that receives input to define a subject of the electronic communication. The body field 140 is an input field that receives input to define a body of the electronic communication. The send control 150 is an input button that, when activated, causes the electronic communication to be sent to addresses defined in the "To" field 110 and causes the electronic communication to be copied to addresses defined in the "CC" field 120. The attach control 160 is an input button that, when activated, causes an interface to be displayed that enables attachment of a file to the electronic communication.

FIG. 1B illustrates a comparison of the draft electronic communication shown in FIG. 1A with file storage information of an electronic storage device (e.g., a hard drive) that stores files that may be attached to the draft electronic communication. As shown, the items of text 170, 172, 174, 176, 178, and 180 included in the draft electronic communication all match portions of the file storage information 181. The file storage information 181 is shown in the form of a table. The file storage information 181 includes a folder column 182, a subfolder column 184, a file name column 186, a user column 188, and a date column 190. The folder column 182 indicates a top-level folder name in the file storage information. The subfolder column 184 indicates a name of a subfolder included in the corresponding folder listed in the folder column 182. The file name column 186 indicates a name of a file included in the corresponding subfolder listed in the subfolder column 184. The user column 188 indicates a name of a user that created (or edited) the file included in the corresponding file name column 186. The date column 190 indicates a date that the file included in the corresponding file name column 186 was last edited.

In this example, the item of text 170 is included in the "To" field 110 and matches entries included in the folder column 182. The item of text 172 is included in the "CC" field 120 and matches entries included in the folder column 182. The item of text 174 is included in the subject field 130 and matches entries included in the file name column 186. The item of text 176 is included in the body field 140 and matches entries included in the file name column 186. The item of text 178 is included in the body field 140 and matches entries included in the subfolder column 184. The item of text 180 is included in the body field 140 and matches entries included in the user column 188.

FIG. 1C illustrates attachment suggestion interfaces that may be displayed when a user selects the attach control 160 at a time when the draft electronic communication shown in FIG. 1B has been entered and content of the draft electronic communication is compared to the file storage information shown in FIG. 1B. As shown, the attachment suggestion interfaces include a suggested files interface 192 and a suggested folders interface 194. The suggested files interface 192 displays a list of suggested files selected based on a comparison of the items of text 170, 172, 174, 176, 178, and 180 included in the draft electronic communication with the file storage information 181. Each entry in the list includes an attach button that causes the corresponding suggested file to be attached to the draft electronic communication when selected. The suggested files interface 192 arranges the most likely files included in the file storage information 181 in a single place that may enable the user to easily select an appropriate file for attachment. The most likely files may be those files that have file storage information (e.g., folder name, subfolder name, file name, user name, etc.) that most closely matches the content of the draft electronic communication.

In the example shown in FIG. 1C, the file Company 1→Widget Production→Report X_Third Quarter.doc is selected as first in the suggested files interface 192 because the file storage information includes the items of text 170, 174, 176, 178, and 180 and a majority of the file storage information matches content from the draft electronic communication (e.g., only a few characters are not included in the draft electronic communication). The file Company 1→Widget Production→Report X-Third Quarter.doc is selected as second in the suggested files interface 192 because the file storage information includes the items of text 170, 174, 176, 178, and 180 and a majority of the file storage information matches content from the draft electronic communication (e.g., only a few characters are not included in the draft electronic communication). In fact, the file Company 1→Widget Production→Report X-Third Quarter.doc may be said to match content from the draft electronic communication as closely as the file Company 1→Widget Production→Report X_Third Quarter.doc. The file Company 1→Widget Production→Report X_Third Quarter.doc is ranked higher than the file Company 1→Widget Production→Report X-Third Quarter.doc because it was created (or edited) more recently as indicated by the date column 190.

The file Company 2→Widget Production→Report X_Third Quarter.doc was selected as third in the suggested files interface 192 because the file storage information includes the items of text 172, 174, 176, 178, and 180 and a majority of the file storage information matches content from the draft electronic communication (e.g., only a few characters are not included in the draft electronic communication). In fact, the file Company 2→Widget Production→Report X_Third Quarter.doc may be said to match content from the draft electronic communication as closely as the first and second files in the suggested files interface 192. The file Company 2→Widget Production→Report X_Third Quarter.doc is ranked lower than the first and second files in the suggested files interface 192 because it matches the item of text 172, whereas the first and second files match the item of text 170. In this case, the item of text 170 is given a higher weight than the item of text 172 because it is in the "To" field 110, whereas the item of text 172 is in the "CC" field 120. The "To" field 110 is given a higher weight than the "CC" field 120 because the address listed in the "To" field 110 is the primary recipient of the electronic communication and an appropriate attachment to the draft electronic communication is more likely to correspond to the address inputted into the "To" field 110 as opposed to the "CC" field 120.

The file Company 1→Widget Production→Report X Third Quarter.doc is selected as fourth in the suggested files interface 192 because the file storage information includes the items of text 170, 174, 176, and 178. The file Company 1→Widget Production→Report X Third Quarter.doc is ranked lower than the first through third files because it matches a lower number of text items than the first through third files (e.g., misses the user column 180). Also, a lower percentage of the file storage information is matched. As such, the file Company 1→Widget Production→Report X Third Quarter.doc is ranked fourth in the suggested files interface 192, which is higher than other possible files for which the file storage information include less matching items of text.

For brevity, only four files are shown as being displayed in the suggested files interface 192. Actual implementations may include more or fewer files. In some examples, the number of files may be set by a user. The number of files also may be automatically determined based on a number of files that match the file storage information with a sufficient degree of similarity. For instance, a similarity score may be determined for each possible file and all files having a score that surpasses a threshold may be selected for inclusion in the suggested files interface 192. A set number of files with the highest scores also may be selected for inclusion in the suggested files interface 192.

The suggested folders interface 194 displays a list of suggested folders selected based on a comparison of the items of text 170, 172, 174, 176, 178, and 180 included in the draft electronic communication with the file storage information 181. Each entry in the list includes a browse button that causes the corresponding suggested folder to be opened for viewing of files stored in the corresponding suggested folder. The suggested folders interface 194 arranges the most likely folders included in the file storage information 181 in a single place that may enable the user to easily select an appropriate folder for finding a file to attach. The most likely folders may be those folders that have file storage information (e.g., folder name, subfolder name, file name, user name, etc.) that most closely matches the content of the draft electronic communication. The suggested folders interface 194 may be generated by comparing only the folder name and subfolder name to the file storage information or may be generated by comparing the folder name and subfolder name in addition to file name and user information of files included in the folder being considered.

In the example shown in FIG. 1C, the folders Company 1→Widget Production and Company 2→Widget Production each match multiple items of text and an entire folder storage path of the folder matches content of the draft electronic communication. Accordingly, the folders Company 1→Widget Production and Company 2→Widget Production are the first two folders included in the suggested folders interface 194. The folder Company 1→Widget Production is selected prior to the folder Company 2→Widget Production because the folder Company 1→Widget Production matches the item of text 170 included in the "To" address field 110, whereas the folder Company 2→Widget Production matches the item of text 172 included in the "CC" address field 120. Because a folder matching content in the "To" address field 110 is more likely appropriate for an attachment suggestion than a folder matching content in the "CC" address field 120, the folder Company 1→Widget Production is selected prior to the folder Company 2→Widget Production.

The folders Company 1→Widget Sales, Company 3→Widget Production, Company 2→Widget Sales each match multiple words in the draft electronic communication, but also each include one word that is not found in the draft electronic communication. Specifically, the folders Company 1→Widget Sales and Company 2→Widget Sales are missing the text "Sales" and the folder Company 3→Widget Production is missing the text "3." Accordingly, the folders Company 1→Widget Sales, Company 3→Widget Production, and Company 2→Widget Sales are the next three folders included in the suggested folders interface 194.

Among the folders Company 1→Widget Sales, Company 3→Widget Production, Company 2→Widget Sales, the folder Company 1→Widget Sales is selected as first because it directly matches text included in the item of text 170 included in the "To" address field 110. Because matching the "To" address field 110 is relatively highly weighted in determining a suggested folder and the folders Company 3→Widget Production and Company 2→Widget Sales do not directly match the item of text 170 included in the "To" address field 110, the folder Company 1→Widget Sales is displayed above the folders Company 3→Widget Production and Company 2→Widget Sales.

In comparing the folders Company 3→Widget Production and Company 2→Widget Sales, the folder Company 3→Widget Production is determined to directly match the item of text 178 included in the body field 140 and the folder Company 2→Widget Sales is determined to directly match the item of text 172 included in the "CC" address field 120. In addition, the folder Company 3→Widget Production is determined to have a direct match for a lowest level folder (e.g., the subfolder column 184) in the folder storage path and the folder Company 2→Widget Sales is determined to have a direct match for a highest level folder (e.g., the folder column 182) in the folder storage path. The folder Company 3→Widget Production was ordered prior to the folder Company 2→Widget Sales based on the determination that the folder Company 3→Widget Production directly matches content in the body field 140 and the folder Company 2→Widget Sales directly matches content in the "CC" address field 120 and/or the determination that the folder Company 3→Widget Production has a direct match for a relatively lower level folder (e.g., the subfolder column 184) in the folder storage path than the folder Company 2→Widget Sales, which has a direct match for a relatively higher level folder (e.g., the folder column 182) in the folder storage path.

The folders Company 1→General, Company 3→Widget Sales, Company 2→General have a single direct match to content in the draft electronic communication, two partial matches to content in the draft electronic communication, and a single direct match to content in the draft electronic communication, respectively. Specifically, the folders Company 1→General and Company 2→General have direct matches for the folder names "Company 1" and "Company 2," respectively, but the folder name "General" does not match the draft electronic communication. The folders Company 1→General, Company 3→Widget Sales, and Company 2→General are the next three folders (e.g., the last three folders in the example shown in FIG. 3) included in the suggested folders interface 194.

Among the folders Company 1→General, Company 3→Widget Sales, Company 2→General, the folder Company 1→General is selected as first because it directly matches text included in the item of text 170 included in the "To" address field 110. Because matching the "To" address field 110 is relatively highly weighted in determining a suggested folder and the folders Company 3→Widget Sales and Company 2→General do not directly match the item of text 170 included in the "To" address field 110, the folder Company 1→Widget Sales is displayed above the folders Company 3→Widget Sales and Company 2→General. Moreover, the folder Company 1→General is ordered prior to the folder Company 3→Widget Sales because, although the folder Company 3→Widget Sales has two partial matches to content in the draft electronic communication, the single, direct match to the "To" address field 110 is weighted more heavily than the multiple, partial matches. The folder Company 3→Widget Sales may be ordered above the folder Company 2→General because the single, direct match to the "CC" address field 120 for the Company 2→General folder is not weighted more heavily than the multiple, partial matches.

Figure 2:
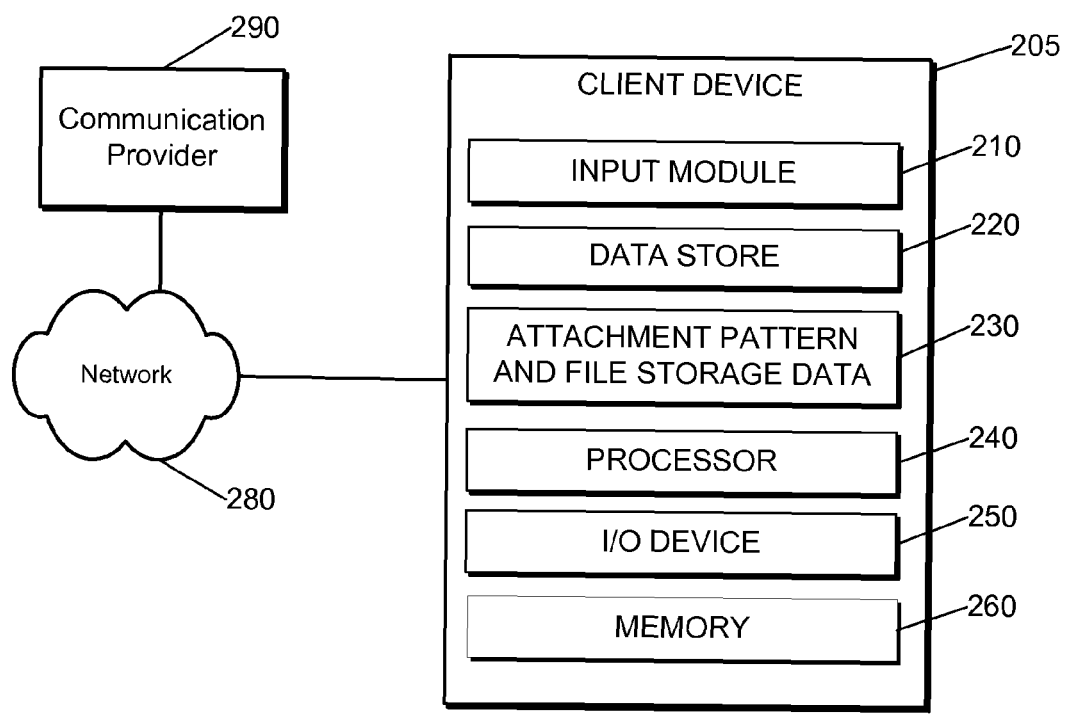
FIG. 2 depicts an example of a system.

Referring to FIG. 2, a block diagram of an electronic communication system 200 is shown. The system 200 includes a client device 205, a network 280, and a communication provider 290. The network 280 enables the client device 205 and the communication provider 290 to exchange electronic communications.

The client device 205 includes an input module 210, a data store 220, attachment pattern and file storage data 230, a processor 240, an input/output (I/O) device 250, and a memory 260. The client device 205 outputs received electronic communications to a user and allow a user to send electronic communications. For instance, the client device 205 allows a user to perceive received electronic communications and send electronic communications. The client device 205 also allows a user to attach one or more files to an electronic communication the user is sending. The client device 205 may include electronic storage (e.g., data store 220) and/or be able to access remote electronic storage that includes one or more files available for attachment to electronic communications. The client device 205 may be a portable device (e.g., smart phone, tablet PC, laptop computer, etc.) or a desktop computer. The client device 205 may be implemented within hardware or a combination of hardware and software.

The input module 210 imports data associated with communication interfaces. The data may include data resulting from received electronic communications. The data also may include data related to settings input by a user that are used in handling electronic communications. The input module 210 may input data from a device (e.g., the communication provider 290) connected to the network 280. In some implementations, the input module 210 reformats and/or transforms the data such that the data may be processed and stored by other components within the client device 205.

The client device 205 also includes a data store 220. In some implementations, data from the input module 210 is stored in the data store 220. The data store 220 may be, for example, a database that logically organizes data into a series of database tables. The data store 220 may be a hard disk drive, non-volatile memory (e.g., Flash memory), or another type of electronic storage device.

The client device 205 also includes attachment pattern and file storage data 230. The attachment pattern data 230 may include tracked data indicative of past attachment behavior of the user (e.g., folders frequently used in attaching files to electronic communications, etc.). The file storage data 230 includes any type of directory or path information that identifies files stored in electronic storage accessible (e.g., locally or remotely) to the client device 205, such as file name information, folder information, sub-folder information, device (e.g., drive) information, etc. The attachment pattern and file storage data 230 may include any attachment pattern data and file storage data described throughout the disclosure. In some implementations, the attachment pattern and file storage data 230 may be received, by the client device 205, from the communication provider 290, or may be stored, at least partially, by the communication provider 290.

The client device 205 also includes a processor 240. The processor 240 may be a processor suitable for the execution of a computer program such as a general or special purpose microprocessor, and any one or more processors of any kind of digital computer. Generally, a processor receives instructions and data from a read-only memory or a random access memory or both. The processor 240 receives instructions and data from the components of the client device 205 to, for example, display interfaces related to electronic communications of a user. In some implementations, the client device 205 includes more than one processor.

The client device 205 further includes the I/O device 250, which is configured to allow user input and display output.

For example, the I/O device 250 may be a mouse, a keyboard, a stylus, a touch screen, a track ball, a toggle control, one or more user input buttons, a microphone, or any other device that allows a user to input data into the client device 205 or otherwise communicate with the client device 205. In some implementations, the user may be a machine and the user input may be received from an automated process running on the machine. In other implementations, the user may be a person.

The I/O device 250 also may include a device configured to output interfaces related to electronic communications. For instance, the I/O device 250 may include a display device configured to display graphical user interfaces that enable a user to perceive electronic communication information and enable a user to interact with the client device 205. The I/O device 250 also may include a speaker configured to provide audible output related to electronic communication information (e.g., audible electronic content or reminders).

The client device 205 also includes a memory 260. The memory 260 may be any type of tangible machine-readable storage medium. The memory 260 may, for example, store the data included in the data store 220. In some implementations, the memory 260 may store instructions that, when executed, cause the client device 205 to, for example, process and display electronic communications. The memory 260 may store instructions that, when executed, cause the client device 205 to perform operations described throughout the disclosure.

The electronic communication system 200 also includes a network 280. The network 280 is configured to enable exchange of electronic communications between devices connected to the network 280. For example, the network 280 may be configured to enable exchange of electronic communications between the client device 205 and the communication provider 290. The network 280 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. Network 280 may include multiple networks or subnetworks, each of which may include, for example, a wired or wireless data pathway. The network 280 may include a circuit-switched network, a packet-switched data network, or any other network able to carry electronic communications. For example, the network 280 may include networks based on the Internet protocol (IP) or asynchronous transfer mode (ATM).

The communication provider 290 is an electronic device configured to execute programs and exchange communications with the client device 205 (e.g., multiple client devices) over the network 280. For example, the communication provider 290 may be configured to execute a program that performs electronic communication processing operations. In this example, the communication provider 290 may exchange communications with the client device 205 to receive input associated with electronic messages and provide suggestions output to the client device 205.

Although the example client device 205 is shown as a single integrated component, one or more of the modules and applications included in the client device 205 may be implemented separately from the device 205 but in communication with the device 205. For example, the data store 220 may be implemented on a centralized server that communicates and exchanges data with the client device 205. In this example, the communication provider 290 may communicate with the client device 205 and perform operations described throughout the disclosure as being performed by the client device 205 or may perform operations that assist in the client device 205 in performing described operations.

FIGS. 3, 6, 9, 11, 13, 15, 18, 20, 23, 25, and 27 illustrate example processes. The operations of the example processes are described generally as being performed by the system 200. The operations may be performed exclusively by the client device 205, may be performed exclusively by the communications provider 290, or may be performed by a combination of the client device 205 and the communications provider 290. In some implementations, operations of the example processes may be performed by one or more processors included in one or more electronic devices.

Figure 3:
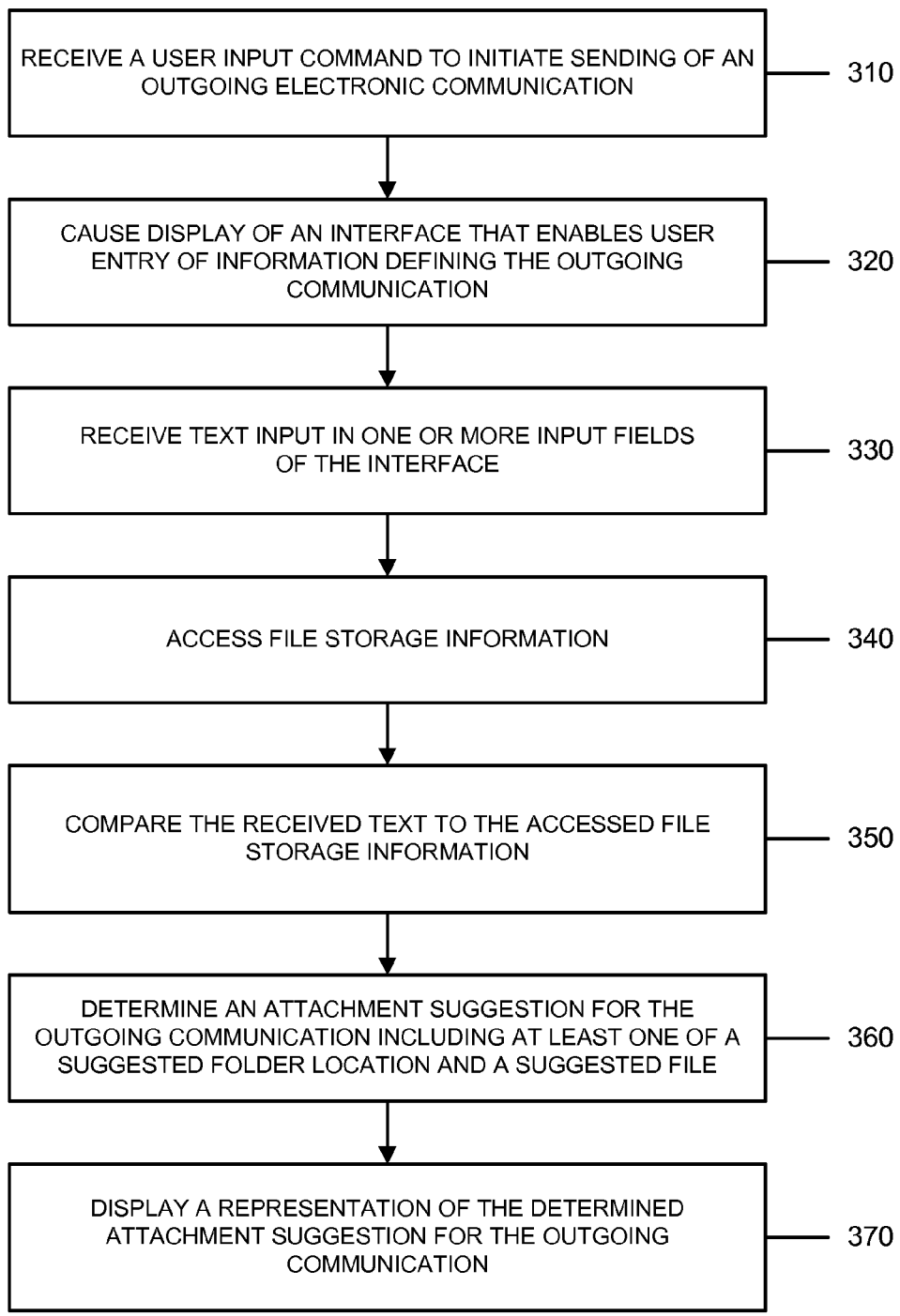
FIGS. 3, 6, 9, 11, 13, 15, 18, 20, 23, 25, and 27 are flowcharts of example processes.

FIG. 3 illustrates an example of a process 300 for determining an attachment suggestion for an outgoing communication. The system 200 receives a user input command to initiate sending of an outgoing electronic communication (310). For instance, the system 200 receives input to initiate sending of an electronic mail message, a text (e.g., SMS) message, an instant message, or any other type of electronic message to which a file can be attached.

In response to receiving the user input command, the system 200 causes display of an interface that enables user entry of information defining the outgoing communication (320). For example, the system 200 displays a graphical user interface that includes one or more fields that enables a user to enter content (e.g., text) defining the electronic communication. In this example, the graphical user interface may be a new electronic mail message interface, a reply electronic mail message interface, a forward electronic mail message interface, or any other type of interface that enables a user to define an electronic communication for sending.

The system 200 receives text input in one or more input fields of the interface (330). For instance, the system 200 receives input from a keyboard being used by a user to type text defining an electronic communication. The text input may be received using any type of input device, such as a keyboard, a keypad, a microphone, a mouse, a touch screen, etc. The system 200 may receive the text input in an address field, a subject field, and/or a body field of the electronic communication.

The system 200 accesses file storage information (340). For example, the system 200 accesses data that defines a directory structure of an electronic storage device that is accessible to the system 200 (e.g., a hard drive, random access memory, read-only memory, a compact disc, a digital video disc, a Flash memory device, an external or remote storage drive, etc.). In this example, the accessed data may include data defining folders included in the directory structure, data defining relationships between the folders in the directory structure, data defining file names of files in the directory structure, and data defining relationships of the file names and the folders.

The system 200 compares the received text to the accessed file storage information (350). For instance, the system 200 compares to the text inputted to define the electronic communication to the folders and file names included in the accessed directory structure data. The system 200 may compare all of the entered content (e.g., text) to the accessed file storage information or may compare only the entered content (e.g., text) from particular fields of the electronic communication (e.g., only the subject line).

Based on the comparison of the received text to the accessed file storage information, the system 200 determines an attachment suggestion for the outgoing communication including at least one of a suggested folder location from which to attach a file and a suggested file to attach (360). For example, the system 200 determines whether one or more folders (e.g., folder names) and/or one or more file names match any of the text (e.g., items of text or words/phrases/numbers) inputted to define the electronic communication. In this example, the system 200 displays the one or more folders that match text inputted to define the electronic communication and the one or more file names that match text inputted to define the electronic communication.

In some implementations, the matching folders and files may be scored and ranked based on how many items of text match the folder name or file name, a location in the electronic communication (e.g., body versus subject) where the matching portion of text is found, and/or a percentage of the folder name or file name that matches entered text defining the electronic communication. In these implementations, a first folder or file name that matches multiple items of text may be weighted higher than a second folder or file name that matches a single item of text. In addition, a first folder or file name that matches an item of text in the subject field may be weighted higher than a second folder or file name that matches an item of text in the body field. Further, a first folder or file name that exactly matches (e.g., a one hundred percent match) one or more items of text may be weighted higher than a second folder or file name that only partially matches (e.g., a fifty percent match) one or more items of text.

In one example, the system 200 may compute a score for a matching folder or file name by assigning a value for each item of text that matches the folder or file name. The value may be selected based on the portion of the electronic communication at which the corresponding item of text is located (e.g., the "To" address field=four, the subject field=three, the "CC" address field=two, and the body field=one). In this example, the system 200 sums the selected values for the folder or file name to compute a summation result. The system 200 also determines a percentage of the folder or file name that matches the items of text included in the draft electronic communication. For instance, the system 200 may divide a number of characters of the folder or file name that match an item of text by the total number of characters of the folder or file name. Then, the system 200 multiplies the summation result by the determined percentage to compute a score for the folder or file name.

The system 200 also may discount items of text that are common or match a relatively large number of folders or files and promote items of text that are uncommon or match a relatively low number of folders or files. The system 200 further may consider placement of a match within a file storage path in assigning a score. For instance, a match to a file name portion of the file storage path may be given a relatively high weight, a match to a subfolder portion of the file storage path may be given a relatively medium weight, and a match to a top level folder portion of the file storage path may be given a relatively low weight.

The system 200 may assign a score for each matching folder and file based on a combination of the factors discussed above (and any other type of relevant information, such as the other information described throughout this disclosure as being used to suggest an attachment). In addition, the scoring and ranking features may be applied to techniques described throughout this disclosure.

In some examples, the system 200 determines an attachment suggestion based on the assigned scores. For example, the system 200 may select a subset of the matching folders and/or files to use as part of an attachment suggestion. In this example, the system 200 may select a particular number (e.g., five) of the matching folders and/or files that have the highest scores. The system 200 also may select all of the matching folders and/or files that have a score that exceeds a particular threshold (e.g., has a particular degree of confidence as being a match). The system 200 further may use all matching folders and/or files as part of the attachment suggestion, but order or rank the matching folders and/or files in the attachment suggestion using the assigned scores. In implementations in which the system 200 selects a single folder to use as a starting point for an attachment interface, the system 200 may select the folder that has the highest assigned score.

Figure 4:
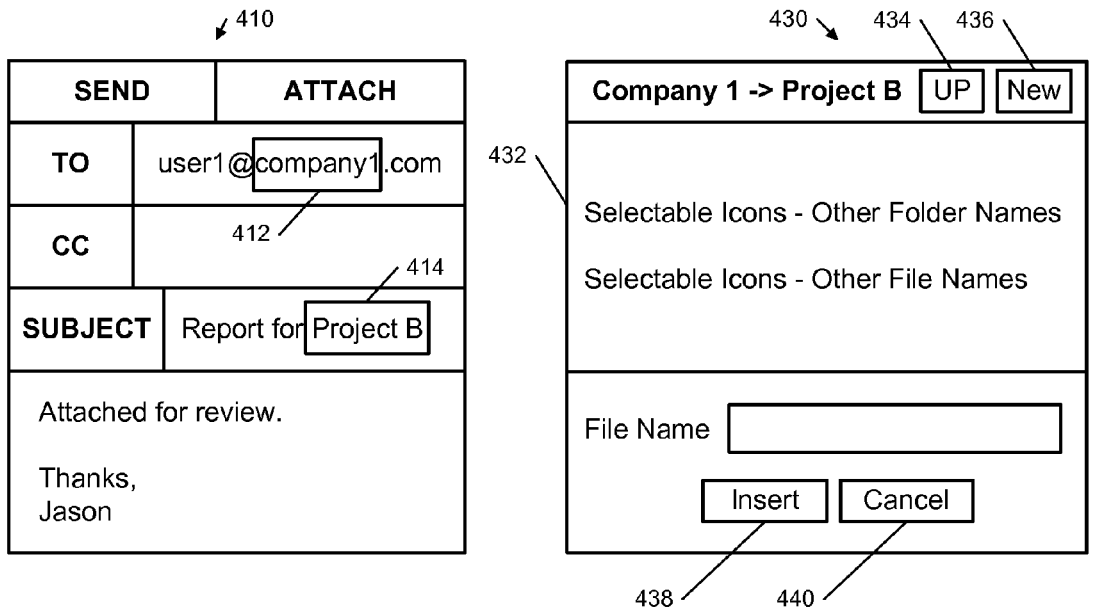
Figure 4:
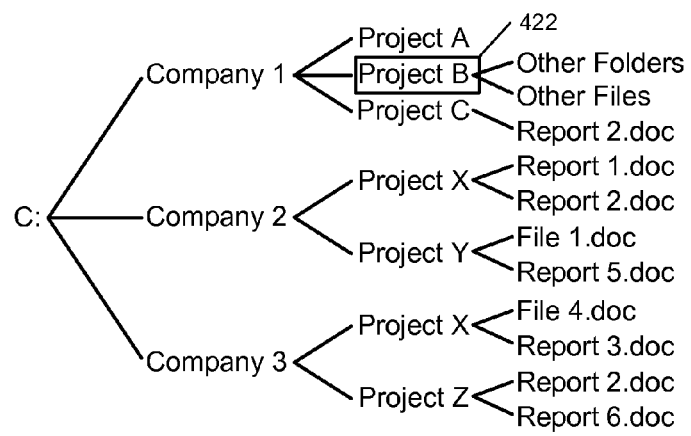
Figure 5:
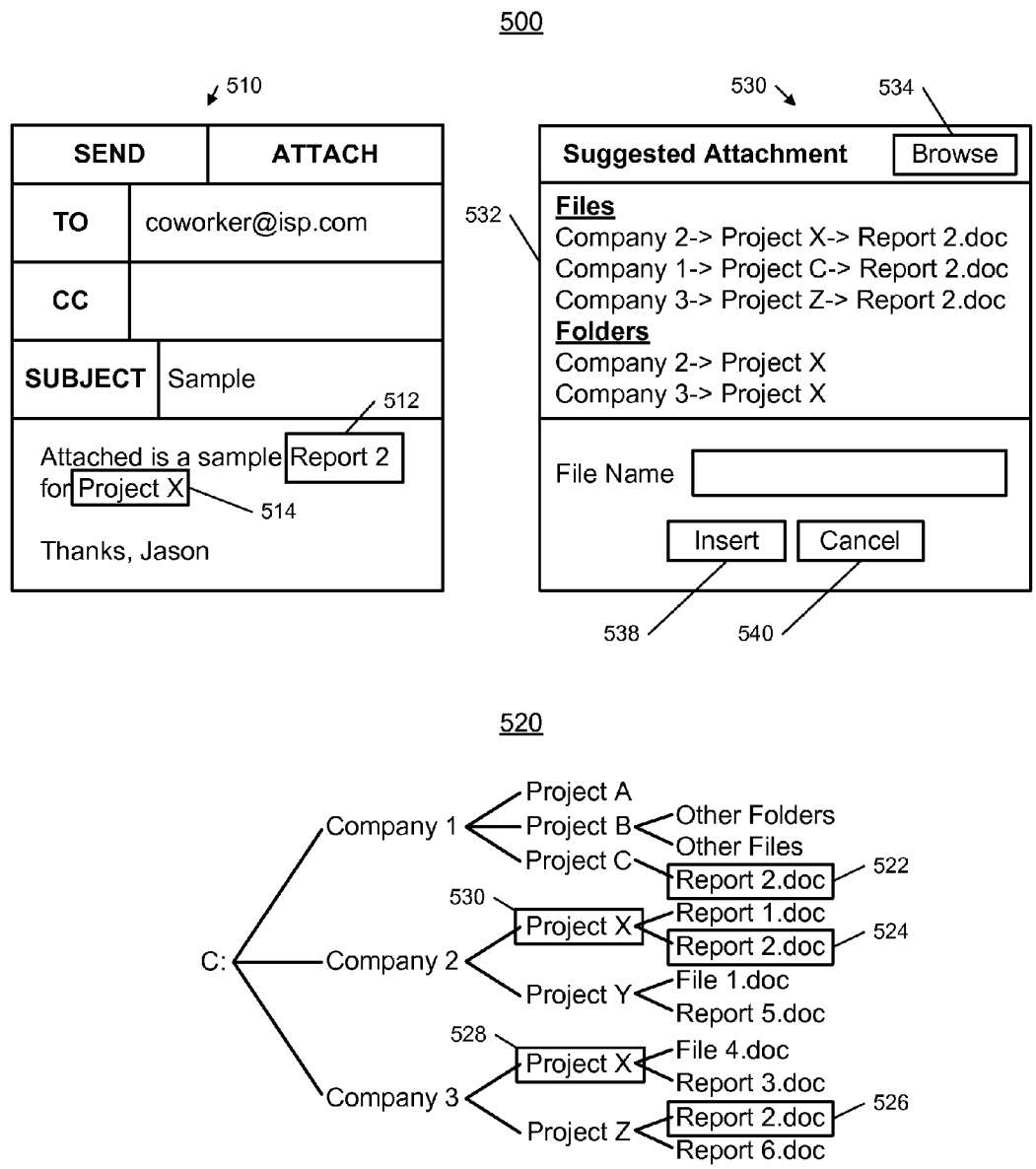

The system 200 displays a representation of the determined attachment suggestion for the outgoing communication (370). For instance, the system 200 displays an interface that lists all of the matching file names and folder names that are suggested for attachment by the user. The interface may arrange the matching file names and folder names in a manner that does not reflect actual directory structure such that files or folders deemed important may be located easily without having to navigate through a large volume of folder names and file names included in the directory structure. The system 200 also may select a folder to use as the initial folder displayed in response to an attachment command as the attachment suggestion. FIGS. 4 and 5 illustrate examples of displaying attachment suggestions.

FIG. 4 illustrates an example 400 of an attachment suggestion provided based on comparing content of a draft electronic communication with file storage information. In the example 400, the system 200 causes display of a communication interface 410 of a draft electronic communication. The draft electronic communication includes an item of text 412 in the "To" field and an item of text 414 in the subject field.

The system 200 also includes a storage device from which a file may be attached to the draft electronic communication and that has file storage information 420. The system 200 compares content from the draft electronic communication (e.g., the items of text 412 and 414 and the other text in the draft electronic communication) with the file storage information 420. In the example 400, the system 200 determines that the items of text 412 and 414 match folder names included in the file storage information 420 and that the other text in the draft electronic communication does not match a folder name in the file storage information. Based on the determination that the items of text 412 and 414 match folder names included in the file storage information 420, the system 200 determines that the item of text 412 matches a higher level folder than the item of text 414. Accordingly, the system 200 compares the item of text 414 of text to subfolders within the higher level folder and detects a matching subfolder 422. The system 200 then determines that the matching subfolder 422 is the lowest level folder that matches content (e.g., text) from within the draft electronic communication and, therefore, suggests the matching subfolder 422 as the most likely folder where an appropriate attachment to the draft electronic communication may be found.

The system 200 displays the attachment interface 430 when the system 200 receives input activating an attach control in the communication interface 410. In the example 400, the matching subfolder 422 (e.g., Company 1→Project B) is displayed to suggest files and folders in the matching subfolder 422, rather than a default folder (e.g., C:). By displaying the matching subfolder 422 (e.g., Company 1→Project B) instead of a default folder, the system 200 may enable a user to locate an appropriate file to attach more quickly because the matching subfolder 422 likely includes files that are relevant to the draft electronic communication.

The attachment interface 430 includes a file and folder list portion 432 that lists file names and folder names included in the matching subfolder 422. The attachment interface 430 also includes an up interface control 434 that enables a user to navigate to the next higher level folder from the matching subfolder 422 (e.g., the folder Company 1) and a new interface control 436 that enables a user to create a new folder in the matching subfolder 422. The attachment interface 430 further includes an insert interface control 438 that enables a user to attach a selected file to the draft electronic communication and a cancel interface control 440 that enables a user to close the attachment interface 430 without attaching a file to the draft electronic communication.

FIG. 5 illustrates an example 500 of an attachment suggestion provided based on comparing content of a draft electronic communication with file storage information. In the example 500, the system 200 causes display of a communication interface 510 of a draft electronic communication. The draft electronic communication includes an item of text 512 in the body field and an item of text 514 in the body field.

The system 200 also includes a storage device from which a file may be attached to the draft electronic communication and that has file storage information 520. The system 200 compares content from the draft electronic communication (e.g., the items of text 512 and 514 and the other text in the draft electronic communication) with the file storage information 520. In the example 500, the system 200 determines that the item of text 512 matches folders 530 and 528 included in the file storage information 520 and that the item of text 514 matches files 522, 524, and 526 included in the file storage information 520. Based on the determination, the system 200 identifies the folders 530 and 528 as folders to suggest for an attachment and identifies the files 522, 524, and 526 as files to suggest for an attachment.

The system 200 displays the attachment interface 530 when the system 200 receives input activating an attach control in the communication interface 510. In the example 500, the attachment interface 530 includes a file and folder list portion 532 that lists the matching (e.g., suggested) files 522, 524, and 526 and the matching (e.g., suggested) folders 530 and 528. A user can select one or more of the matching files 522, 524, and 526 to attach to the draft electronic communication and the user can select one of the matching folders 530 and 528 to cause the attachment interface 530 to display contents of the selected folder.

In the file and folder list portion 532, the file 524 is listed or suggested first although each of the matching files 522 and 526 match text from the electronic communication equally well. The file 524 is ordered first because it is the only matching file that is stored in a matching folder in the file storage information 520. Although neither the matching file 522 nor the matching file 526 are stored in a matching folder, the system 200 can order the two in providing the attachment interface 530. For instance, the file 522 is ordered prior to the file 526 because the portion of the file storage information 520 that includes the file 526 also includes a matching folder 528, but it does not correspond to the file 526. This suggests that the matching file 526 is less likely to be appropriate because it is not included within the folder that also matches the content of the draft electronic communication. Because the portion of the file storage information 520 that includes the file 522 does not include a matching folder, the system 200 orders the file 522 prior to the file 526.

In the file and folder list portion 532, the folder 530 is listed or suggested before the folder 528 although each of the folders 530 and 528 match text from the electronic communication equally well. The folder 530 is ordered prior to the folder 528 because the folder 530 includes a matching file (i.e., the matching file 524) within it, whereas the folder 528 does not include a matching file within it.

The attachment interface 530 also includes a browse interface control 534 that enables a user to navigate a directory structure of a storage device to locate a file to attach. The attachment interface 530 further includes an insert interface control 538 that enables a user to attach a selected file to the draft electronic communication and a cancel interface control 540 that enables a user to close the attachment interface 530 without attaching a file to the draft electronic communication.

Figure 6:
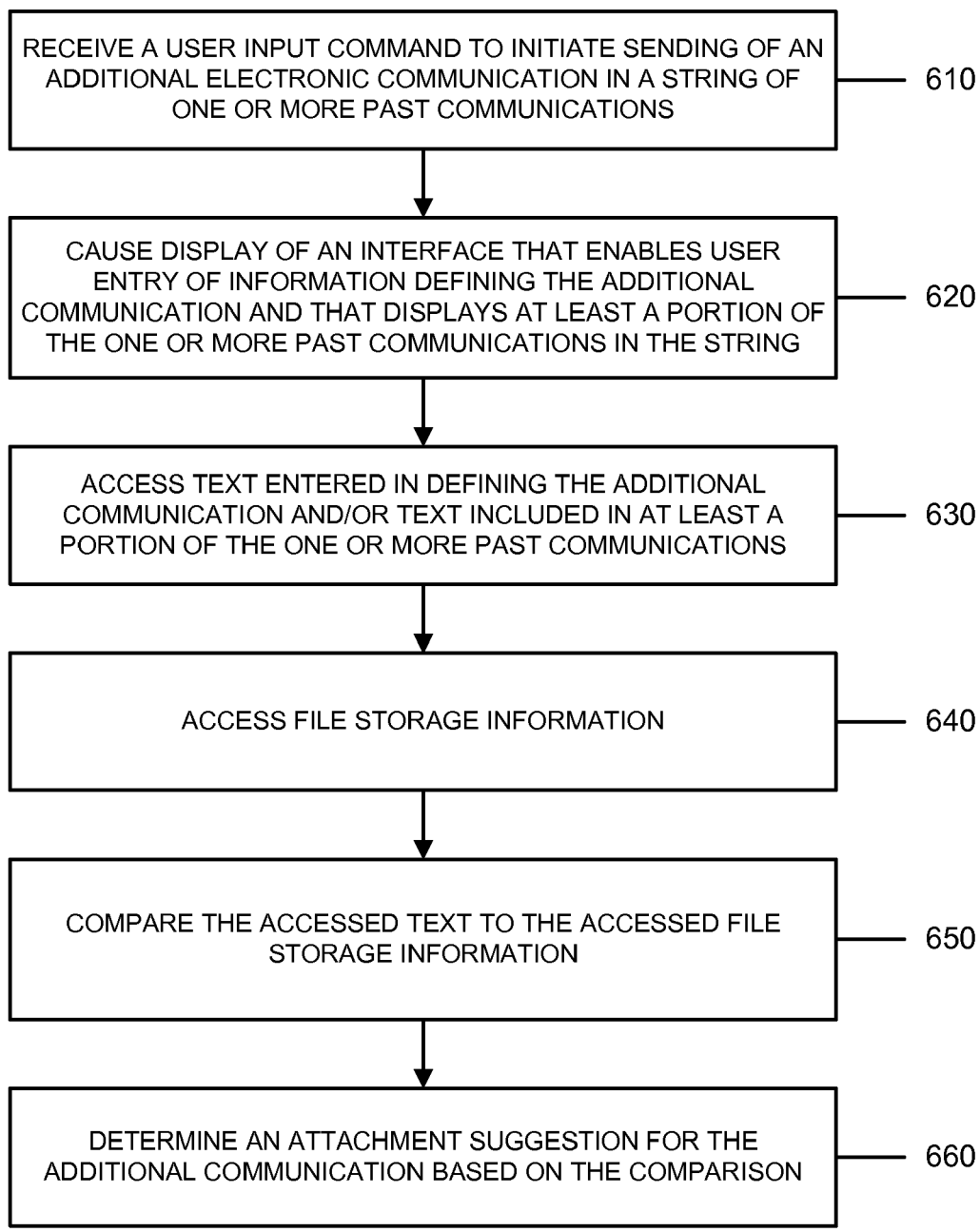

FIG. 6 illustrates an example of a process 600 for determining an attachment suggestion for an additional communication in a string of communications. The system 200 receives a user input command to initiate sending of an additional electronic communication in a string of one or more past communications (610). For example, the system 200 receives input to initiate sending of an electronic mail message, a text (e.g., SMS) message, an instant message, or any other type of electronic message to which a file can be attached. In this example, the additional electronic communication is in a string of one or more past communications and adds another communication to the string. The additional communication may be a reply communication or a forward communication. The reply communication may be a communication that sends a response to a user who sent a past communication in the string. The forward communication may be a communication that forwards a past communication in the string to a user that was not part of the past communications in the string.

In response to receiving the user input command, the system 200 causes display of an interface that enables user entry of information defining the additional communication and that displays at least a portion of the one or more past communications in the string (620). For example, the system 200 displays a graphical user interface that includes one or more fields that enable a user to enter content (e.g., text) defining the additional electronic communication. In this example, the graphical user interface may be a reply electronic mail message interface, a forward electronic mail message interface, or any other type of interface that enables a user to define an additional communication that is part of a string of past communications. The graphical user interface may display one or more of the past communications in the string and information related to the sending and/or receipt of the one or more past communications.

The system 200 accesses text entered in defining the additional communication and/or text included in at least a portion of the one or more past communications (630). For instance, the system 200 receives input from a keyboard being used by a user to type text defining an additional electronic communication in the string. The text input may be received using any type of input device, such as a keyboard, a keypad, a microphone, a mouse, a touch screen, etc.

The system 200 also may access text included in one or more of the past communications in the string. For instance, the system 200 may identify the one or more of the past communications in the string in response to input initiating sending of the additional communication and access the text of the identified one or more past communications from electronic storage that stores the one or more past communications. The system 200 may access all of the content (e.g., text) of the identified one or more past communications or may access only a portion of the content (e.g., text), such as sender information and subject line information. The system 200 may determine which portion of the content (e.g., text) of the identified one or more past communications is displayed in a graphical user interface the user is using to define the additional communication and then access the displayed content (e.g., text). The system 200 also may access content from only a particular number of past communications (e.g., three) in the string, as the additional communication is likely most relevant to the recent communications in the string.

The system 200 accesses file storage information (640). For example, the system 200 accesses data the defines a directory structure of an electronic storage device that is accessible to the system 200 (e.g., a hard drive, random access memory, read-only memory, a compact disc, a digital video disc, a Flash memory device, an external or remote storage drive, etc.). In this example, the accessed data may include data defining folders included in the directory structure, data defining relationships between the folders in the directory structure, data defining file names of files in the directory structure, and data defining relationships of the file names and the folders.

The system 200 compares the accessed text to the accessed file storage information (650). For instance, the system 200 compares the text inputted to define the additional electronic communication to the folders and file names included in the accessed directory structure data. The system 200 may compare all of the entered content (e.g., text) to the accessed file storage information or may compare only the entered content (e.g., text) from particular fields of the electronic communication (e.g., only the subject line).

The system 200 also compares the accessed content (e.g., text) from the one or more past communications in the string to the folders and file names included in the accessed directory structure data. The system 200 may compare all of the accessed content (e.g., text) to the accessed file storage information or may compare only the accessed content (e.g., text) from particular fields of the past electronic communications (e.g., only the past sender information).

Based on the comparison of the accessed text to the accessed file storage information, the system 200 determines an attachment suggestion for the additional communication (660). For instance, the system 200 determines whether one or more folders (e.g., folder names) and/or one or more file names match any of the text (e.g., items of text or words/phrases/numbers) inputted to define the additional electronic communication. The system 200 also determines whether one or more folders (e.g., folder names) and/or one or more file names match any of the text (e.g., items of text or words/phrases/numbers) accessed from the one or more past communications included in the string. In some examples, the system 200 may determine an attachment suggestion based only on content from the one or more past communications included in the string (e.g., when the additional communication has no content (e.g., text) that matches a file name or folder name in the file storage information).

In some implementations, the matching folders and files may be scored and ranked based on how many items of text match the folder name or file name, a location in the electronic communication (e.g., body versus subject) where the matching portion of text is found, and/or a percentage of the folder name or file name that matches entered text defining the electronic communication. In these implementations, a first folder or file name that matches multiple items of text may be weighted higher than a second folder or file name that matches a single item of text. In addition, a first folder or file name that matches an item of text in the subject field may be weighted higher than a second folder or file name that matches an item of text in the body field. Further, a first folder or file name that exactly matches (e.g., a one hundred percent match) one or more items of text may be weighted higher than a second folder or file name that only partially matches (e.g., a fifty percent match) one or more items of text. The system 200 also may discount items of text that are common or match a relatively large number of folders or files and promote items of text that are uncommon or match a relatively low number of folders or files. The system 200 may assign a score for each matching folder and file based on a combination of these factors (and any other type of relevant information, such as the other information described throughout this disclosure as being used to suggest an attachment).

In situations in which a user is sending an additional communication in a string of past communications, the system 200 may score and rank matching folders and files based on whether the folders and files match an item of text in the additional communication being defined for one of the past communications. For instance, a first folder or file name that matches an item of text in the additional communication may be weighted higher than a second folder or file name that matches an item of text in a past communication. The system 200 may determine a date (or placement in the string) of a past communication that includes an item of text that matches a file or folder and assign a weight to the match based on the determined date (or placement in the string). For example, the system 200 may assign a first folder or file that matches text from the additional communication being defined a relatively high weight, may assign a second folder or file that matches text from the past communication in the string that immediately preceded the additional communication (e.g., the most recent past communication) a relatively medium weight, and may assign a third folder or file that matches text from the second most recent past communication in the string a relatively low weight. In this example, the system 200 may provide no weight or not even consider text from electronic communications in the string that were exchanged prior to the second most recent past communication in the string.

In some examples, the system 200 determines an attachment suggestion based on the assigned scores. For example, the system 200 may select a subset of the matching folders and/or files to use as part of an attachment suggestion. In this example, the system 200 may select a particular number (e.g., five) of the matching folders and/or files that have the highest scores. The system 200 also may select all of the matching folders and/or files that have a score that exceeds a particular threshold (e.g., has a particular degree of confidence as being a match). The system 200 further may use all matching folders and/or files as part of the attachment suggestion, but order or rank the matching folders and/or files in the attachment suggestion using the assigned scores. In implementations in which the system 200 selects a single folder to use as a starting point for an attachment interface, the system 200 may select the folder that has the highest assigned score.

Figure 7:
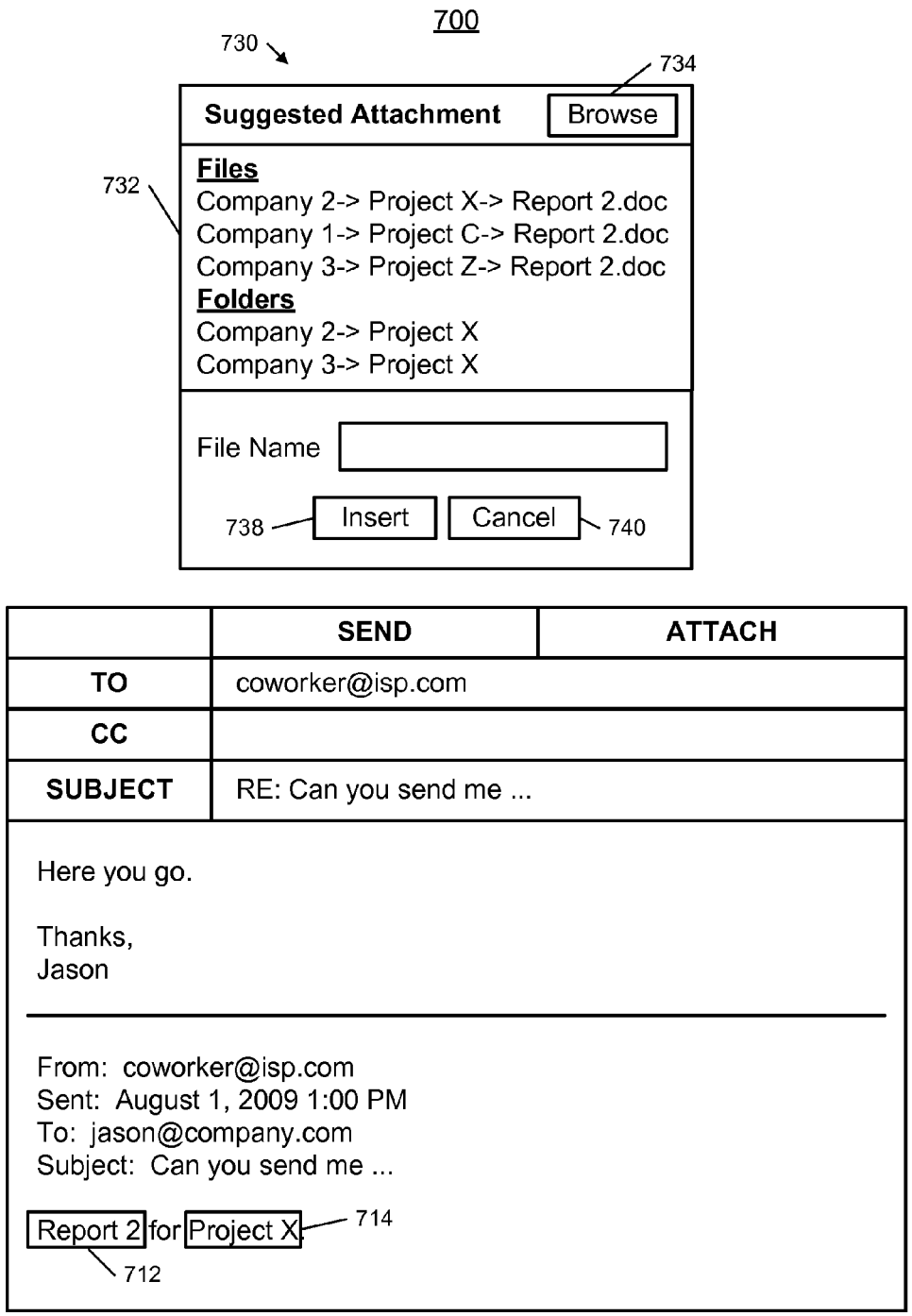
Figure 8:
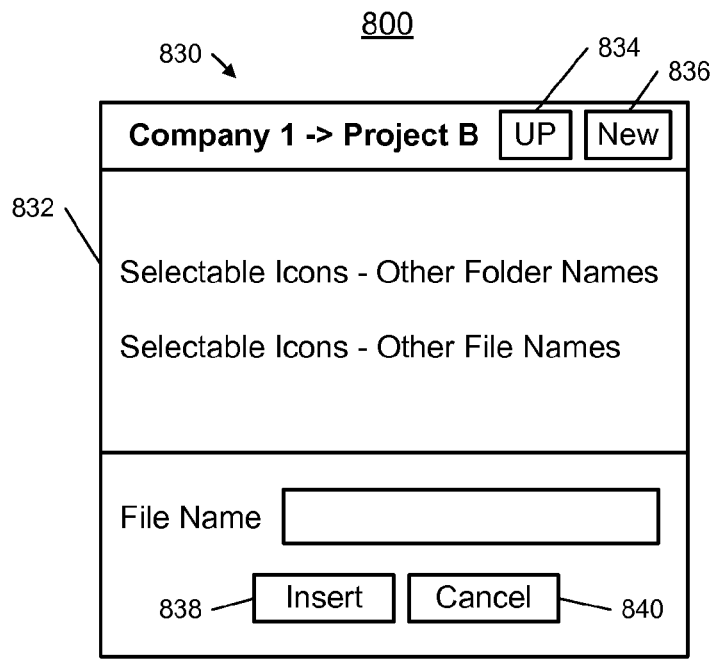

The system 200 may cause display of an interface that lists all of the matching file names and folder names that are suggested for attachment by the user. The interface may arrange the matching file names and folder names in a manner that does not reflect actual directory structure such that files or folders deemed important may be located easily without having to navigate through a large volume of folder names and file names included in the directory structure. The system 200 also may select a folder to use as the initial folder displayed in response to an attachment command as the attachment suggestion. FIGS. 7 and 8 illustrate examples of displaying attachment suggestions for additional communications in a string of past communications.

FIG. 7 illustrates an example 700 of an attachment suggestion provided based on comparing content of a past electronic communication in a string with file storage information. In the example 700, the system 200 causes display of a reply communication interface to enable a user to reply to a past communication in a string. The past electronic communication to which the user is replying includes an item of text 712 in the body field and an item of text 714 in the body field.

The system 200 also includes a storage device from which a file may be attached to the reply electronic communication and that has file storage information. In this example, the file storage information is the same as the file storage information 520 shown in FIG. 5. The system 200 compares content from the reply electronic communication and the past electronic communication to which the user is replying (e.g., the items of text 712 and 714) with the file storage information 520.

In the example 700, the system 200 determines that the item of text 714 matches folders 530 and 528 included in the file storage information 520 and that the item of text 712 matches files 522, 524, and 526 included in the file storage information 520. Based on the determination, the system 200 identifies the folders 530 and 528 as folders to suggest for an attachment and identifies the files 522, 524, and 526 as files to suggest for an attachment. The reply electronic communication being entered by the user does not include any content that matches the file storage information 520. As such, the content in the past electronic communication to which the user is replying is used to provide attachment suggestions.

The system 200 displays the attachment interface 730 when the system 200 receives input activating an attach control in the reply communication interface. In the example 700, the attachment interface 730 includes a file and folder list portion 732 that lists the matching (e.g., suggested) files 522, 524, and 526 and the matching (e.g., suggested) folders 530 and 528. A user can select one or more of the matching files 522, 524, and 526 to attach to the reply electronic communication and the user can select one of the matching folders 530 and 528 to cause the attachment interface 730 to display contents of the selected folder.

The attachment interface 730 also includes a browse interface control 734 that enables a user to navigate a directory structure of a storage device to locate a file to attach. The attachment interface 730 further includes an insert interface control 738 that enables a user to attach a selected file to the reply electronic communication and a cancel interface control 740 that enables a user to close the attachment interface 730 without attaching a file to the reply electronic communication.

FIG. 8 illustrates an example 800 of an attachment suggestion provided based on comparing content of a past electronic communication in a string with file storage information. In the example 800, the system 200 causes display of a forward communication interface to enable a user to forward a past communication in a string. The past electronic communication that the user is forwarding includes an item of text 812 in the "From" field and an item of text 814 in the body field.

The system 200 also includes a storage device from which a file may be attached to the forward electronic communication and that has file storage information. In this example, the file storage information is the same as the file storage information 420 shown in FIG. 4. The system 200 compares content from the forward electronic communication and the past electronic communication that the user is forwarding (e.g., the items of text 812 and 814) with the file storage information 420. In the example 800, the system 200 determines that the items of text 812 and 814 match folder names included in the file storage information 420. Based on the determination that the items of text 812 and 814 match folder names included in the file storage information 420, the system 200 determines that the item of text 812 matches a higher level folder than the item of text 814. Accordingly, the system 200 compares the item of text 814 to subfolders within the higher level folder and detects a matching subfolder 422. The system 200 then determines that the matching subfolder 422 is the lowest level folder that matches content (e.g., text) from within the forward electronic communication and the past communication that the user is forwarding. Therefore, the system 200 suggests the matching subfolder 422 as the most likely folder where an appropriate attachment to the forward electronic communication may be found. The forward electronic communication being entered by the user does not include any content that matches the file storage information 420. As such, the content in the past electronic communication that the user is forwarding is used to provide attachment suggestions.

The system 200 displays the attachment interface 830 when the system 200 receives input activating an attach control in the forward communication interface. In the example 800, the matching subfolder 422 (e.g., Company 1→Project B) is displayed to suggest files and folders in the matching subfolder 422, rather than a default folder (e.g., C:). By displaying the matching subfolder 422 (e.g., Company 1→Project B) instead of a default folder, the system 200 may enable a user to locate an appropriate file to attach more quickly because the matching subfolder 422 likely includes files that are relevant to the forward electronic communication because a past electronic communication in the string includes content that matches the subfolder 422.

The attachment interface 830 includes a file and folder list portion 832 that lists file names and folder names included in the matching subfolder 422. The attachment interface 830 also includes an up interface control 834 that enables a user to navigate to the next higher level folder from the matching subfolder 422 (e.g., the folder Company 1) and a new interface control 836 that enables a user to create a new folder in the matching subfolder 422. The attachment interface 830 further includes an insert interface control 838 that enables a user to attach a selected file to the forward electronic communication and a cancel interface control 840 that enables a user to close the attachment interface 830 without attaching a file to the forward electronic communication.

Figure 9:
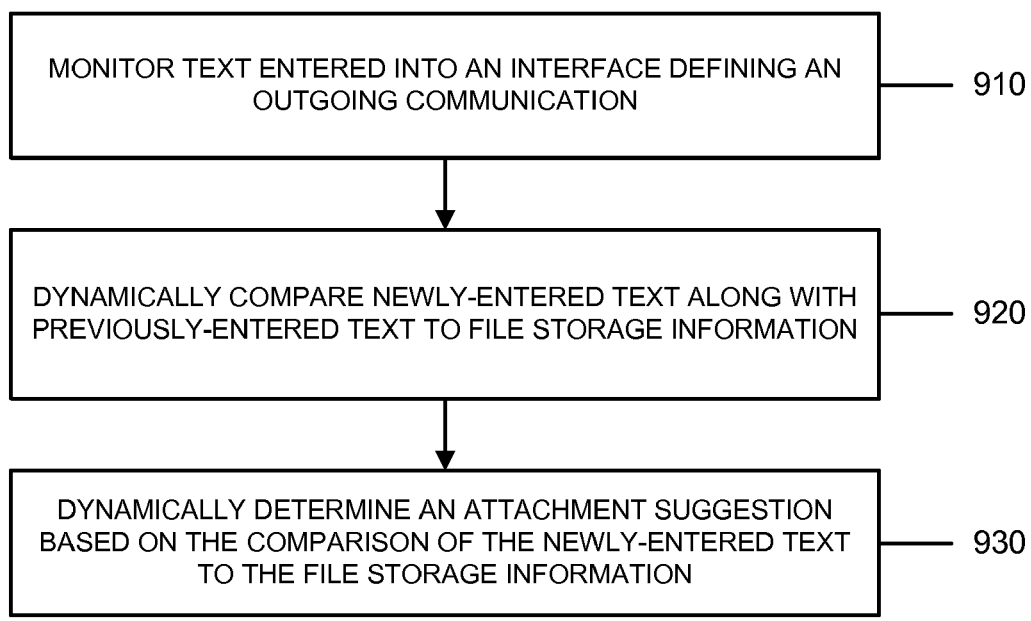

FIG. 9 illustrates an example of a process 900 for dynamically determining an attachment suggestion. The system 200 monitors text entered into an interface defining an outgoing communication (910). For instance, the system 200 tracks content being entered to define an electronic communication to detect when new input has been received.

The system 200 dynamically compares newly-entered text along with previously-entered text to file storage information (920). For example, the system 200 compares the new input received in defining the electronic communication to the file storage information. In this example, the system 200 compares newly-entered text for the electronic communication to the file storage information as the text is being entered.

In addition, the system 200 may trigger a new attachment suggestion process when newly-entered text is detected. The new attachment suggestion process may account for both the newly-entered text and the previously-entered text. Alternatively, the new attachment suggestion process may account for only the newly-entered text.

Figure 10:
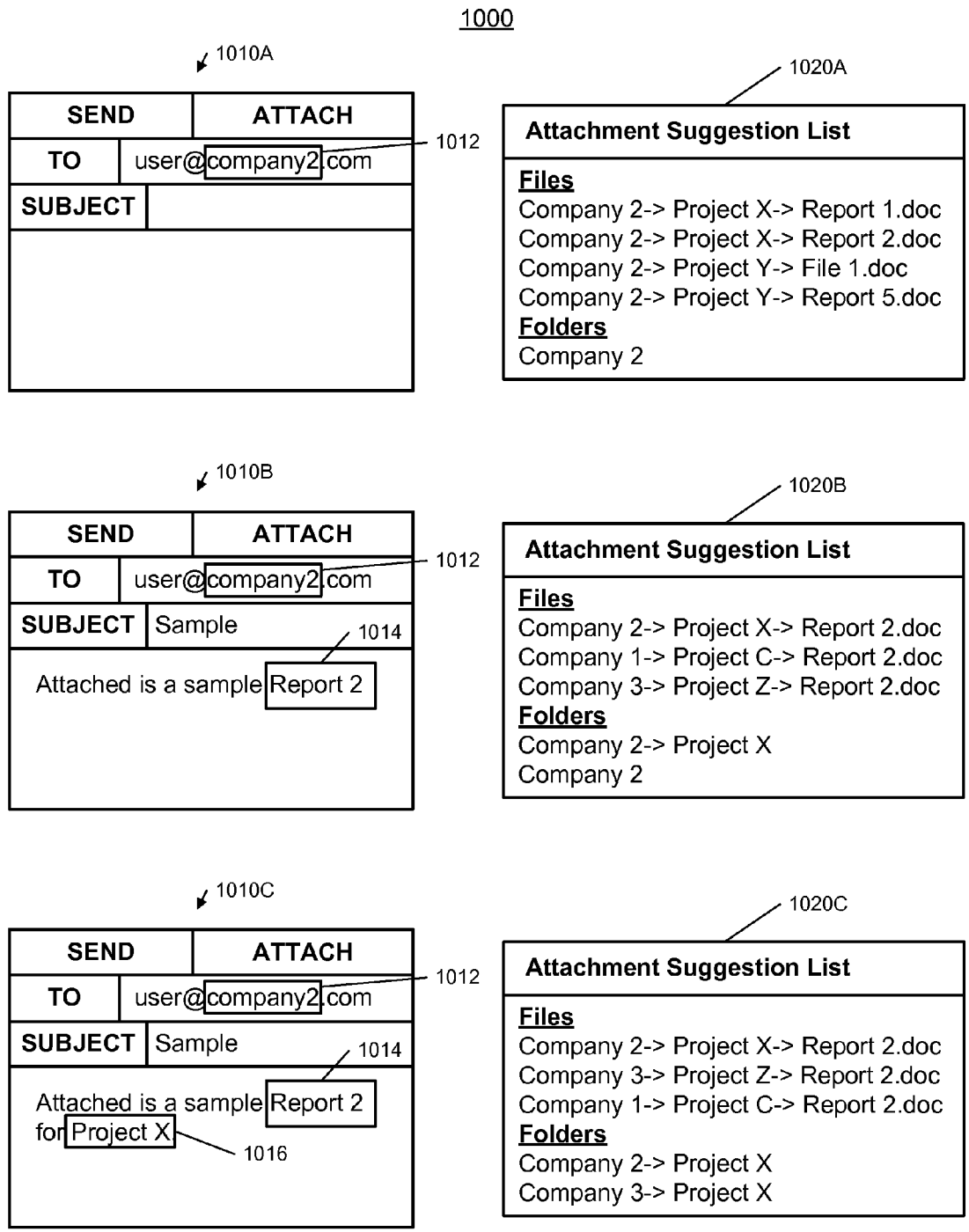

The system 200 dynamically determines an attachment suggestion based on the comparison of the newly-entered text to the file storage information (930). For instance, the system 200 determines whether one or more folders (e.g., folder names) and/or one or more file names match any of the newly-entered text (e.g., items of text or words/phrases/numbers) inputted to define the electronic communication. The system 200 may update an order of suggested files and/or folders based on the comparison of the newly-entered text to the file storage information or may identify new suggested files and/or folders based on the comparison of the newly-entered text to the file storage information. The system 200 may retain the dynamically determined attachment suggestion in electronic storage and present the dynamically determined attachment suggestion to the user if the user inputs a command to attach a file to the electronic communication. In other examples, the system 200 may update an attachment suggestion interface that is persistently displayed while the user is entering text defining the electronic communication based on the dynamically determined attachment suggestion. FIG. 10 illustrates an example of dynamically determining an attachment suggestion while the system 200 is receiving text input by the user in defining an electronic communication.

In some implementations, the system 200 may update scores assigned to files and folders included the file storage information based on the comparison of the newly-entered text to the file storage information. For instance, the system 200 may have identified matching files and folders included the file storage information and assigned scores to the matching files and folders based on a comparison of the previously-entered text to the file storage information. In these implementations, the system 200 may compare the matching files and folders to the newly-entered text to determine whether the matching files and folders also match the newly-entered text. When the system 200 determines that a first, matching file or folder also matches the newly-entered text, the system 200 may increase the score assigned to the first, matching file or folder. When the system 200 determines that a second, matching file or folder does not match the newly-entered text, the system 200 may maintain or decrease the score assigned to the second, matching file or folder. By updating the scores based on the newly-entered text, the system 200 may dynamically determine an attachment suggestion and account for the most recent available information. In addition, the system 200 can control the attachment suggestion by promoting files and/or folders that are reinforced by the newly-entered text and demoting files and/or folders that are not reinforced by the newly-entered text. The updated scores may be used to re-sort or re-order the matching files and folders identified using the previously-entered text.

The system 200 also may detect new matching files and/or folders based on the comparison of the newly-entered text to the file storage information. For instance, the comparison of the newly-entered text to the file storage information may reveal new, matching files and/or folders that did not match the previously-entered text. The new, matching files and/or folders may be included in an attachment suggestion. The new, matching files and/or folders may be ranked or scored higher than the previous, matching files and/or folders. Alternatively, the new, matching files and/or folders may be ranked or scored lower than the previous, matching files and/or folders.

In some examples, when the attachment suggestion is part of a display that is displayed while the user is defining the electronic communication, the new, matching files and/or folders may be added to the attachment suggestion display in a manner that is distinguished from the previous, matching files and/or folders. In these examples, the new, matching files and/or folders may be displayed in bold or in a different color or with graphical indicators that indicate that the new, matching files and/or folders are being displayed based on newly-entered text. The distinguishing effects for the new, matching files and/or folders may fade over time or as further text defining the electronic communication is entered. In some implementations, previous, matching files and/or folders may be distinguished in the attachment suggestion display when the previous, matching files and/or folders also match the newly-entered text. In these implementations, the previous, matching files and/or folders may be distinguished in the attachment suggestion display when the newly-entered text increases a score associated with the previous, matching files and/or folders (e.g., increases a score from below a threshold score to above the threshold score).

FIG. 10 illustrates an example 1000 of updating an attachment suggestion list as a user is composing an electronic communication. In the example 1000, the system 200 causes display of a communication interface of a draft electronic communication. At a first point in time, the draft electronic communication 1010A includes an item of text 1012 in the "To" field. For instance, at the first point in time, the user has only entered an address of the recipient of the draft electronic communication.

As the user enters content (e.g., text) into the draft electronic communication, the system 200 compares the entered text to file storage information and automatically updates an attachment suggestion list. The attachment suggestion list may be a list maintained in electronic storage and used to provide an attachment suggestion to the user when the user selects an attach control. In some examples, the attachment suggestion list may be a list of suggested attachments that is displayed to the user while the user is composing the draft electronic communication. In these examples, the displayed list is dynamically updated as the user enters additional content defining the draft electronic communication.

In the example 1000, the system 200 compares the content defining the electronic communication to the file storage information 520 shown in FIG. 5. At the first point in time, the system 200 compares content from the draft electronic communication 1010A (e.g., the item of text 1012) with the file storage information 520. At the first point in time, the system 200 determines that the item of text 1012 matches a single folder included in the file storage information 520. Based on the determination, the system 200 includes the matching folder as a suggested folder in the attachment suggestion list 1020A and all of the files organized within the matching folder as suggested files.

At a second point in time, the draft electronic communication 1010B includes, in addition to the item of text 1012 in the "To" field, an item of text 1014 in the body field. For instance, at the second point in time, the user has entered a subject to the draft electronic communication and a portion of a body of the draft electronic communication. At the second point in time, the system 200 compares the additional content from the draft electronic communication 1010B (e.g., the item of text 1014) with the file storage information 520. At the second point in time, the system 200 determines that the item of text 1012 still matches a single folder included in the file storage information 520, but that the item of text 1014 also matches several file names in the file storage information 520 (i.e., the files 522, 524, and 526). Based on the determination, the system 200 updates the attachment suggestion list 1020B to include the several matching files (i.e., the files 522, 524, and 526) as the suggested files in the attachment suggestion list 1020B. The system 200 arranges the file 524 first in the list of suggested files because it is organized under a folder that matches content from the draft electronic communication, whereas the other suggested files are not. The system 200 also updates the attachment suggestion list 1020B to include two suggested folders, even though only a single folder in the file storage information 520 matches content from the draft electronic communication. The two suggested folders include the single folder in the file storage information 520 that matches content from the draft electronic communication and also a subfolder included in the matching folder. The system 200 includes the subfolder and arranges it first in the suggested folders list because it includes one of the matching files.

At a third point in time, the draft electronic communication 1010C includes, in addition to the item of text 1012 in the "To" field and the item of text 1014 in the body field, another item of text 1016 in the body field. For instance, at the third point in time, the user has entered additional text in the body of the draft electronic communication. At the third point in time, the system 200 compares the additional content from the draft electronic communication 1010C (e.g., the item of text 1016) with the file storage information 520. At the third point in time, the system 200 determines that the item of text 1012 still matches a single folder included in the file storage information 520, also that the item of text 1014 still matches several file names in the file storage information 520 (i.e., the files 522, 524, and 526), and further that the item of text 1016 matches several folders in the file storage information 520 (i.e., the folders 530 and 528). Based on the determination, the system 200 updates the attachment suggestion list 1020C to include the several matching folders (i.e., the folders 530 and 528) as the suggested folders in the attachment suggestion list 1020C. The system 200 arranges the folder 530 first in the list of suggested folders because its complete path matches two items of text in the draft electronic communication and the complete path of the folder 528 matches one item of text in the draft electronic communication. The system 200 also updates the attachment suggestion list 1020C to adjust an order or ranking of the suggested files. Although the several matching files (i.e., the files 522, 524, and 526) remain as the suggested files in the attachment suggestion list 1020C, the order or rank has been changed based on the additional content added to the draft electronic communication. Specifically, the file 526 has been moved ahead of the file 522 because the file 526 is organized closer to a matching folder (i.e., the folder 528) than the file 522.

By dynamically updating the attachment suggestion list as a user enters content defining a draft communication, the system 200 may provide fast and relevant suggestions to a user that leverage all of the information available at the time of the suggestion. When the attachment suggestion list is displayed, a user may attach a file when an appropriate file is displayed in the list, which may enhance the convenience of the user and assist the user in not forgetting to attach an appropriate file. When the attachment suggestion list is maintained in electronic storage (e.g., not displayed), an attachment suggestion may be provided to a user more quickly after activating an attach control because the processing to compare entered content with the file storage information has already been completed.

Figure 11:
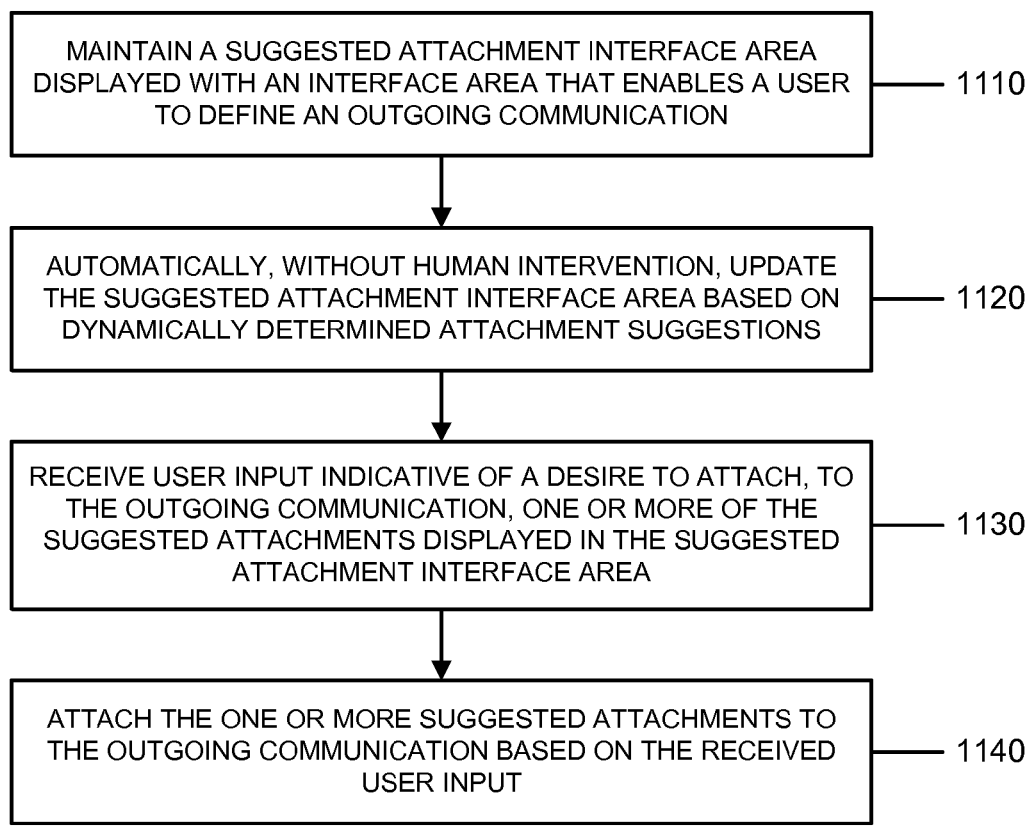

FIG. 11 illustrates an example of a process 1100 for leveraging a suggested attachment interface area to facilitate attachments. The system 200 maintains a suggested attachment interface area displayed with an interface area that enables a user to define an outgoing communication (1110). For example, the system 200 may display an attachment suggestion interface area that is persistently displayed while the user is entering text defining an electronic communication. The attachment suggestion interface area may be integrated in a communication interface that enables a user to define an electronic communication or may be displayed as a separate interface (e.g., a pop-up window) that is displayed with a communication interface that enables a user to define an electronic communication.

The system 200 automatically, without human intervention, updates the suggested attachment interface area based on dynamically determined attachment suggestions (1120). For instance, the system 200 changes the suggested attachment interface area based on new content (e.g., text) that is entered to define the electronic communication. The system 200 may update the interface any time new text results in a change in the order or rank of suggested files and/or folders or results in the files and/or folders that are suggested. The attachment suggestions may be dynamically determined using techniques described above with respect to FIG. 10.

In some examples, new, matching files and/or folders may be added to the attachment suggestion interface area in a manner that is distinguished from previous, matching files and/or folders displayed in the attachment suggestion interface area. In these examples, the new, matching files and/or folders may be displayed in bold or in a different color or with graphical indicators that indicate that the new, matching files and/or folders are being displayed based on newly-entered text. The distinguishing effects for the new, matching files and/or folders may fade over time or as further text defining the electronic communication is entered.

In some implementations, previous, matching files and/or folders may be distinguished in the attachment suggestion interface area when the previous, matching files and/or folders also match the newly-entered text. In these implementations, the previous, matching files and/or folders may be distinguished in the attachment suggestion interface area when the newly-entered text increases a score associated with the previous, matching files and/or folders (e.g., increases a score from below a threshold score to above the threshold score).

The system 200 receives user input indicative of a desire to attach, to the outgoing communication, one or more of the suggested attachments displayed in the suggested attachment interface area (1130). For instance, the system 200 may receive any type of user input that results in a command to attach a file displayed in the suggested attachment interface area to the electronic communication. The user input may include double clicking a mouse cursor of a suggested file, dragging a suggested file from the suggested attachment interface area to an attached files interface area, activating an attach interface control corresponding to a suggested file, or any other type of user input that can convey an attach file command.

The system 200 attaches the one or more suggested attachments to the outgoing communication based on the received user input (1140). For instance, the one or more suggested files may be associated with the electronic communication as attachments. As such, when the electronic communication is sent, the one or more suggested files are sent along with the electronic communication as attachments.

Figure 12:
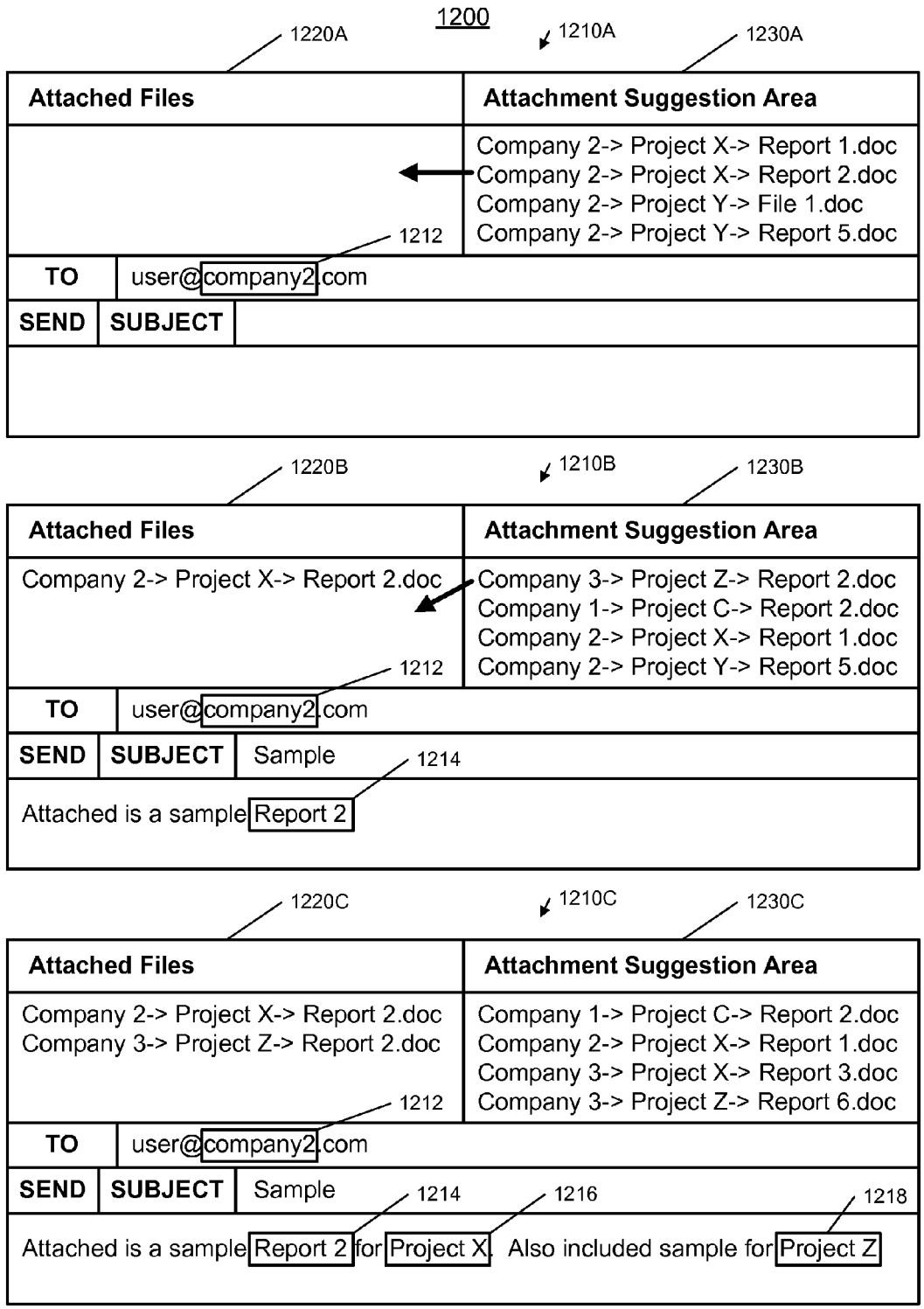

FIG. 12 illustrates an example 1200 of attaching files to an electronic communication using a dynamically updating attachment suggestion area that is displayed as a user enters content to define the electronic communication. In the example 1200, the system 200 causes display of a communication interface of a draft electronic communication. At a first point in time, the draft electronic communication 1210A includes an item of text 1212 in the "To" field. For instance, at the first point in time, the user has only entered an address of the recipient of the draft electronic communication.

In the example 1200, the system 200 compares the content defining the electronic communication to the file storage information 520 shown in FIG. 5. At the first point in time, the system 200 compares content from the draft electronic communication 1210A (e.g., the item of text 1212) with the file storage information 520. At the first point in time, the system 200 determines that the item of text 1212 matches a single folder included in the file storage information 520 that has four files organized under the matching folder. Based on the determination, the system 200 displays the four files in the attachment suggestion area 1230A. The user is able to attach a suggested file to the electronic communication by dragging a suggested file displayed in the attachment suggestion area 1230A into the attached files area 1220A. As shown, a user drags the file Company 2→Project X→Report 2.doc to the attached files area 1220A to attach it to the electronic communication.

At a second point in time, the draft electronic communication 1210B includes, in addition to the item of text 1212 in the "To" field, an item of text 1214 in the body field. For instance, at the second point in time, the user has entered a subject to the draft electronic communication and a portion of a body of the draft electronic communication. At the second point in time, the system 200 compares the additional content from the draft electronic communication 1210B (e.g., the item of text 1214) with the file storage information 520. At the second point in time, the system 200 determines that the item of text 1212 still matches a single folder included in the file storage information 520, but that the item of text 1214 also matches several file names in the file storage information 520 (i.e., the files 522, 524, and 526). Based on the determination, the system 200 updates the attachment suggestion area 1230B to include the four most likely (e.g., highest ranked) files based on the comparison of the content included in the draft electronic communication with the file storage information 520. As shown, the system 200 selects the matching files 522 and 526 as the first two files in the attachment suggestion area 1230B. The matching file 524 is not displayed in the attachment suggestion area 1230B because it has already been attached to the draft electronic communication and is displayed in the attached files area 1220B. The system 200 selects two out of the three other files included in the single matching folder (i.e., Company 2) to display in the attachment suggestion area 1230B. The two files are selected because they include the term "Report," which is found in the draft electronic communication, and the other file does not.

The user is able to attach a suggested file to the electronic communication by dragging a suggested file displayed in the attachment suggestion area 1230A into the attached files area 1220A. As shown, a user drags the file Company 3→Project Z→Report 2.doc to the attached files area 1220A to attach it to the electronic communication.

At a third point in time, the draft electronic communication 1210C includes, in addition to the item of text 1212 in the "To" field and the item of text 1214 in the body field, another two items of text 1216 and 1218 in the body field. For instance, at the third point in time, the user has entered additional text in the body of the draft electronic communication. At the third point in time, the system 200 compares the additional content from the draft electronic communication 1210C (e.g., the items of text 1216 and 1218) with the file storage information 520. At the third point in time, the system 200 determines that the item of text 1212 still matches a single folder included in the file storage information 520, also that the item of text 1214 still matches several file names in the file storage information 520 (i.e., the files 522, 524, and 526), further that the item of text 1216 matches several folders in the file storage information 520 (i.e., the folders 530 and 528), and that the item of text 1218 matches a single folder in the file storage information 520. Based on the determination, the system 200 updates the attachment suggestion area 1230C to include the four most likely (e.g., highest ranked) files based on the comparison of the content included in the draft electronic communication with the file storage information 520.

The matching files 524 and 526 are not displayed in the attachment suggestion area 1230C because they have already been attached to the draft electronic communication and are displayed in the attached files area 1220C. As shown, the system 200 selects the matching file 522 as the first file in the attachment suggestion area 1230C because it is the only file that has a file name that matches text in the draft electronic communication in its entirety other than the file extension (i.e., .doc). The second file in the attachment suggestion area 1230C has a folder path that matches two items of text and has a file name that matches "Report." The third and fourth files in the attachment suggestion area 1230C each have a folder path that matches one item of text and each have a file name that matches "Report."

By dynamically updating the attachment suggestion area as a user enters content defining a draft communication, the system 200 may provide fast and relevant suggestions to a user that leverage all of the information available at the time of the suggestion. A user may easily attach a file by dragging an appropriate file from the attachment suggestion area to the attached files area when the appropriate file is displayed in the attachment suggestion area. This may enhance the convenience of the user and assist the user in not forgetting to attach an appropriate file.

Figure 13:
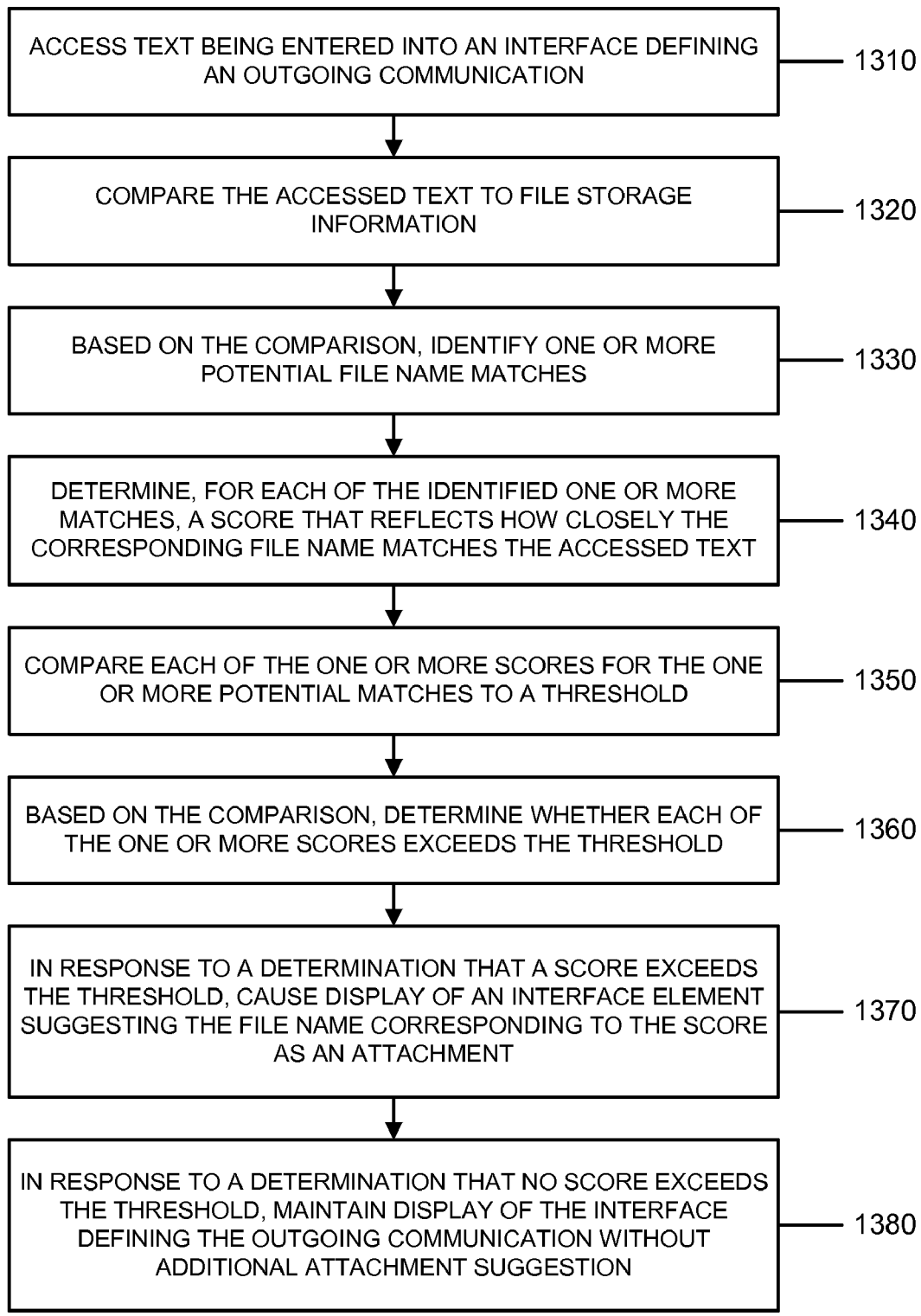

FIG. 13 illustrates an example of a process 1300 for displaying an attachment suggestion for an outgoing communication as text defining the outgoing communication is entered. The system 200 accesses text being entered into an interface defining an outgoing communication (1310). For instance, the system 200 receives input from a keyboard being used by a user to type text defining an electronic communication. The text input may be received using any type of input device, such as a keyboard, a keypad, a microphone, a mouse, a touch screen, etc. The system 200 may access the text as it is being entered into the interface.

The system 200 compares the accessed text to file storage information (1320). For example, the system 200 accesses data that defines a directory structure of an electronic storage device that is accessible to the system 200 (e.g., a hard drive, random access memory, read-only memory, a compact disc, a digital video disc, a Flash memory device, an external or remote storage drive, etc.). In this example, the accessed data may include data defining folders included in the directory structure, data defining relationships between the folders in the directory structure, data defining file names of files in the directory structure, and data defining relationships of the file names and the folders.

Then, the system 200 compares the accessed text to the accessed file storage information. For instance, the system 200 compares the text inputted to define the electronic communication to the folders and file names included in the accessed directory structure data. The system 200 may compare all of the entered content (e.g., text) to the accessed file storage information or may compare only the entered content (e.g., text) from particular fields of the electronic communication (e.g., only the subject line).

Based on the comparison, the system 200 identifies one or more potential file name matches (1330). For example, the system 200 determines whether one or more file names match any of the text (e.g., items of text or words/phrases/numbers) inputted to define the electronic communication and identifies one or more file names that at least partially match the accessed text.

The system 200 determines, for each of the identified one or more potential file name matches, a score that reflects how closely the corresponding file name matches the accessed text (1340). The identified one or more potential file name matches may be scored based on how many items of text match the file name and/or a percentage of the file name that matches entered text defining the electronic communication. In these implementations, a first file name that matches multiple items of text may be scored higher than a second file name that matches a single item of text. Further, a first file name that exactly matches (e.g., a one hundred percent match) one or more items of text may be scored higher than a second file name that only partially matches (e.g., a fifty percent match) one or more items of text. The system 200 also may reduce a score for items of text that are common or match a relatively large number of files and increase a score for items of text that are uncommon or match a relatively low number of files. The system 200 may assign a score for each matching file based on a combination of these factors (and any other type of relevant information, such as the other information described throughout this disclosure as being used to suggest an attachment).

The system 200 compares each of the one or more scores for the one or more potential matches to a threshold (1350) and, based on the comparison of the one or more scores to the threshold, the system 200 determines whether each of the one or more scores exceeds the threshold (1360). For instance, the system 200 accesses a threshold value from electronic storage and determines whether each of the one or more scores for the one or more potential matches exceeds the accessed threshold. A score may exceed the threshold when the score reflects a closeness in a match that exceeds a closeness in match reflected by the threshold. When high scores indicate a relatively high degree of closeness in a match, the determination of whether a score exceeds the threshold may be a determination of whether the score is equal to or greater than the threshold.

In response to a determination that a score exceeds the threshold, the system 200 causes display of an interface element suggesting the file name corresponding to the score as an attachment (1370). For example, the system 200 displays a pop-up interface that suggests the file name associated with the score that exceeds the threshold. In this example, the system 200 may display the pop-up interface as the user is continuing to enter text and may enable the user to attach the suggested file with relative ease (e.g., a single mouse click, a keyboard command, a voice command, etc.). FIG. 14 illustrates an example of causing display of an interface element suggesting the file name corresponding to the score as an attachment.

By displaying a pop-up interface that suggests the file name associated with the score that exceeds the threshold, the system 200 may enhance a user's experience by alerting the user to the fact that an attachment may be appropriate for the electronic communication and providing the user with a relatively easy mechanism for completing the attachment (e.g., when the suggested attachment is appropriate, the user may attach the suggested file without having to select an attach control or review a file storage system directory).

In response to a determination that no score exceeds the threshold, the system 200 maintains display of the interface defining the outgoing communication without additional attachment suggestion (1380). For instance, the system 200 maintains the displayed communication interface without providing a pop-up interface with an attachment suggestion. By maintaining the communication interface without providing a pop-up interface with an attachment suggestion, the system 200 may avoid distracting or annoying a user with a large number of suggestions. In this regard, the system 200 may reserve the pop-up interface with an attachment suggestion for matches that have a relatively high degree of confidence or closeness in a match to the entered text.

FIG. 14 illustrates an example 1400 of an attachment suggestion provided when a suggested file match has a relatively high score or degree of confidence in the match. In the example 1400, the system 200 causes display of a communication interface of a draft electronic communication. The draft electronic communication includes an item of text 1410 in the body field.

As the user enters content (e.g., text) into the draft electronic communication, the system 200 compares the entered text to file storage information and, instead of or in addition to automatically updating an attachment suggestion list, the system 200 determines whether a portion of the entered text matches a part of the file storage information relatively closely (e.g., with a relatively high degree of similarity). When the system 200 identifies a portion of the entered text that matches a part of the file storage information relatively closely (e.g., with a relatively high degree of similarity), the system 200 automatically, without human intervention, initiates a display of an attachment suggestion to suggest the relatively close match. For instance, the system 200 may, as the user types, display a pop-up window to suggest a relatively close match when a close match is detected.

In the example 1400, the system 200 determines that the item of text 1410 matches the file Company 2→Project X→Report 2.doc with sufficient similarity (e.g., has a similarity score that is greater than a threshold) because the item of text 1410 matches two folders and the file name included in the complete path of the file. In response to the system 200 determining that the item of text 1410 matches the file Company 2→Project X→Report 2.doc with sufficient similarity, the system 200 displays a pop-up interface 1420 to suggest attaching the file Company 2→Project X→Report 2.doc. The pop-up interface 1420 includes a "Yes" interface control 1422 that enables a user to attach the suggested file to the electronic communication and a "No" interface control 1424 that enables the user to decline attaching the suggested file to the electronic communication. The pop-up interface 1420 may fade over time (e.g., disappear in five seconds) if the user takes no action with respect to the pop-up interface 1420. The pop-up interface 1420 also may be replaced or hidden when the user enters additional text that matches a different file with sufficient similarity and a new pop-up interface is displayed.

By displaying the suggested file to the user as the user is entering text defining the electronic communication, the user may quickly and easily attach an appropriate file to the electronic communication. In addition, because the system 200 only suggests files that match entered text with a high degree of confidence or similarity, the user may not be burdened with a large number of suggestions that would distract the user in defining the electronic communication.

Figure 15:
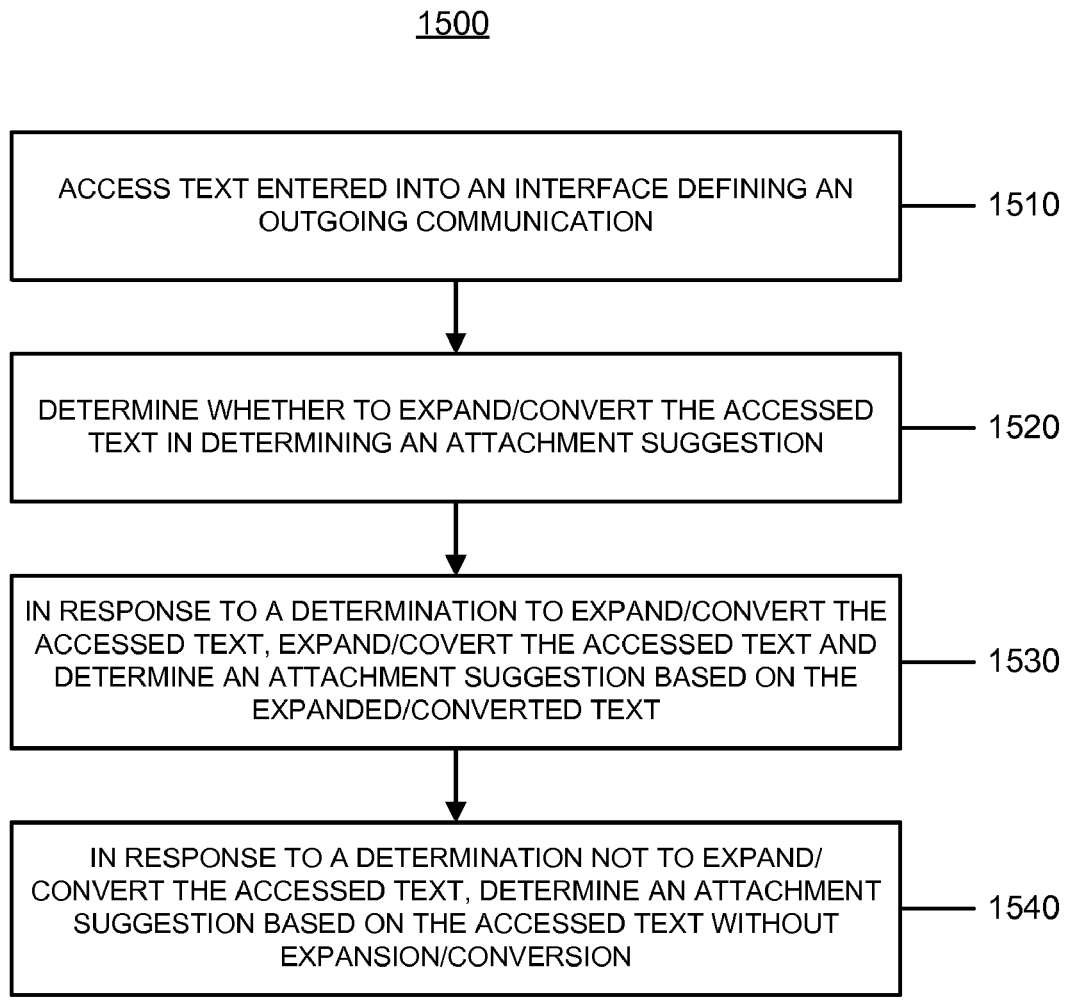

FIG. 15 illustrates an example of a process 1500 for determining an attachment suggestion based on expansion and/or conversion of text. The system 200 accesses text entered into an interface defining an outgoing communication (1510). For instance, the system 200 receives input from a keyboard being used by a user to type text defining an electronic communication. The text input may be received using any type of input device, such as a keyboard, a keypad, a microphone, a mouse, a touch screen, etc.

The system 200 determines whether to expand and/or convert the accessed text in determining an attachment suggestion (1520). For instance, the system 200 may analyze the accessed text with respect to one or more rules that define which items of text may be expanded and/or converted. The system 200 may determine whether related keywords (e.g., synonyms) exist for an item of text and determine to expand the item of text when related keywords exist. The system 200 may identify items of text that may be expressed in other formats (e.g., items of text such as dates, days of the week, acronyms, abbreviations, initials, etc.) and determine that the identified items of text should be converted into other formats.

In response to a determination to expand and/or convert the accessed text, the system 200 expands and/or converts the accessed text and determines an attachment suggestion based on the expanded and/or converted text (1530). The system 200 may expand the text by adding additional information to the text. For instance, the system 200 may add related keywords (e.g., synonyms) to accessed text or other context information. The system 200 also may convert the accessed text into other possible formats that represent the same information as the accessed text. For instance, the system 200 may convert dates into various formats for expressing a date or may convert abbreviations or acronyms into full words or vice versa.

The system 200 uses the expanded and/or converted text to determine an attachment suggestion. The expanded and/or converted text may be used alone or may be used in combination with an unmodified version of the expanded and/or converted text. Any of the techniques described throughout this disclosure may be used to determine the attachment suggestion.

In some implementations, the expanded and/or converted text may be given a lower weight than text that has not been modified. In these implementations, a first folder or file that matches the expanded and/or converted text may be weighted or scored lower than a second folder or file that matches the direct text entered by the user.

In response to a determination not to expand and/or convert the accessed text, the system 200 determines an attachment suggestion based on the accessed text without expansion and/or conversion (1540). For instance, the system 200 uses the text entered to define the electronic communication directly (e.g., without modification) to determine an attachment suggestion. Any of the techniques described throughout this disclosure may be used to determine the attachment suggestion.

Figure 16:
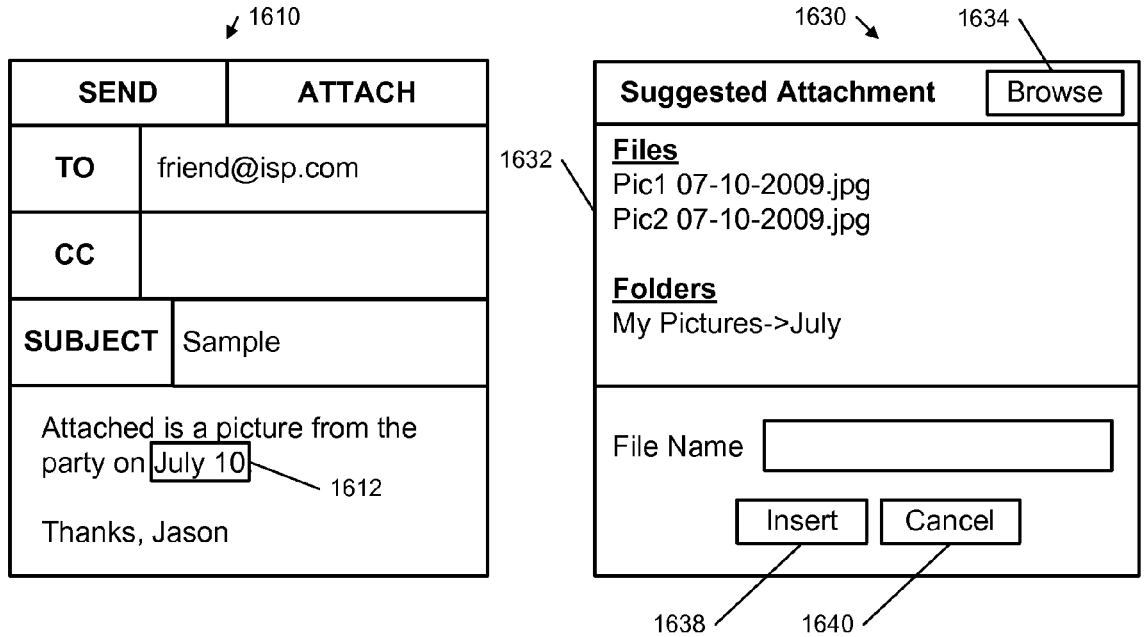
Figure 16:
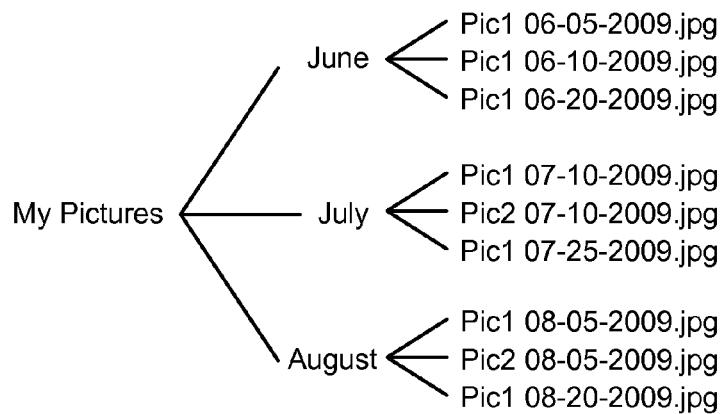

FIG. 16 illustrates an example 1600 of an attachment suggestion provided based on comparing converted content of a draft electronic communication with file storage information. In the example 1600, the system 200 causes display of a communication interface 1610 of a draft electronic communication. The draft electronic communication includes an item of text 1612 in the body field.

The system 200 also includes a storage device from which a file may be attached to the draft electronic communication and that has file storage information 1620. The system 200 compares content from the draft electronic communication (e.g., the item of text 1612 and the other text in the draft electronic communication) with the file storage information 1620. In the example 1600, the system 200 compares the item of text 1612 directly with the file storage information 1620, but also determines that the item of text 1612 is possible of being expressed in other formats (e.g., 07-10). In response to the determination that the item of text 1612 is possible of being expressed in other formats, the system 200 converts the item of text 1612 into other formats (e.g., 07-10) and compares the converted item of text to the file storage information 1620.

In the example 1600, the comparison of the item of text 1612 (e.g., July 10) directly with the file storage information 1620 results in a single folder match, but does not result in any file matches. The comparison of the converted item of text (e.g., 07-10) with the file storage information 1620 results in multiple file matches, but does not result in any folder matches. As such, the system 200 uses the single folder match found using the unconverted item of text 1612 and the multiple file name matches found using the converted item of text (e.g., 07-10) in an attachment suggestion.

The system 200 displays the attachment interface 1630 when the system 200 receives input activating an attach control in the communication interface 1610. In the example 1600, the attachment interface 1630 includes a file and folder list portion 1632 that lists the matching (e.g., suggested) files and the matching (e.g., suggested) folder. A user can select one or more of the matching files to attach to the draft electronic communication and the user can select the matching folder to cause the attachment interface 1630 to display contents of the selected folder.

The attachment interface 1630 also includes a browse interface control 1634 that enables a user to navigate a directory structure of a storage device to locate a file to attach. The attachment interface 1630 further includes an insert interface control 1638 that enables a user to attach a selected file to the draft electronic communication and a cancel interface control 1640 that enables a user to close the attachment interface 1630 without attaching a file to the draft electronic communication.

Figure 17:
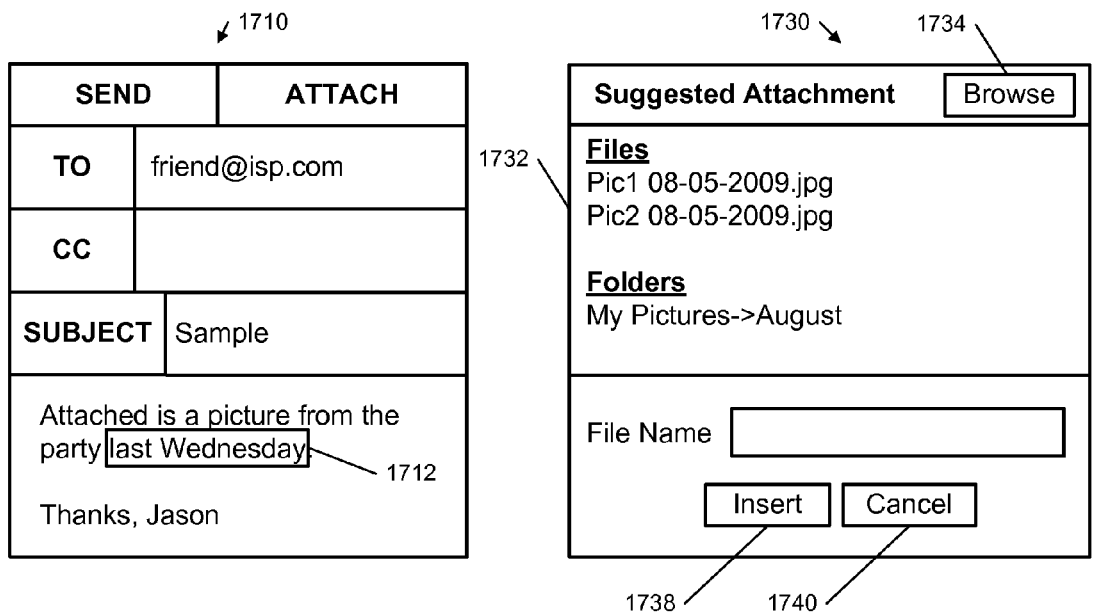
Figure 17:
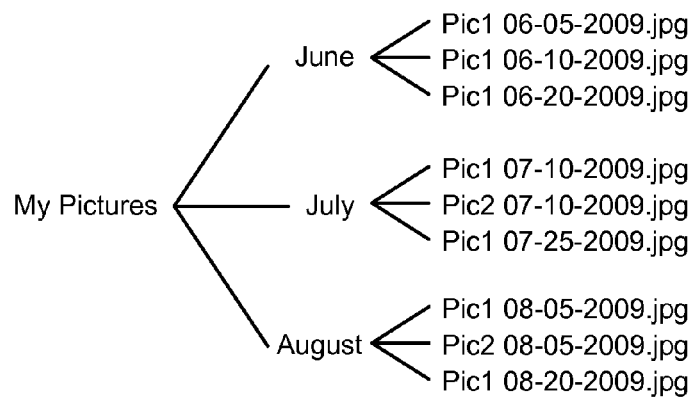

FIG. 17 illustrates an example 1700 of an attachment suggestion provided based on comparing expanded content of a draft electronic communication with file storage information. In the example 1700, the system 200 causes display of a communication interface 1710 of a draft electronic communication. The draft electronic communication includes an item of text 1712 in the body field.

The system 200 also includes a storage device from which a file may be attached to the draft electronic communication and that has file storage information 1720. The system 200 compares content from the draft electronic communication (e.g., the item of text 1712 and the other text in the draft electronic communication) with the file storage information 1720. In the example 1700, the system 200 compares the item of text 1712 directly with the file storage information 1720, but also determines that the item of text 1712 is possible of being expanded to include other relevant information. For example, the system 200 may determine that more information related to the item of text 1712 "last Wednesday" may be obtained from an electronic calendar application. In this example, the system 200 uses the calendar application to determine a current date and then a date of the most recently passed Wednesday based on the current date. The system 200 then uses variations of the date of the most recently passed Wednesday to compare with the file storage information 1720. In this case, the most recently passed Wednesday was Aug. 5, 2009, so the variations include multiple formats and permutations of expressing the date (e.g., August; Aug. 5, 2009; 08-05-09; 08-05; 08/05/09; 08/05; etc.).

In the example 1700, the comparison of the item of text 1712 (e.g., last Wednesday) directly with the file storage information 1720 does not result in any matches. The comparison of the expanded item of text (e.g., the variations of the date) with the file storage information 1720 results in multiple file matches and a single folder match. As such, the system 200 uses the multiple file matches and the single folder match found using the expanded item of text (e.g., August and 08-05-09) in an attachment suggestion.

The system 200 displays the attachment interface 1730 when the system 200 receives input activating an attach control in the communication interface 1710. In the example

1700, the attachment interface 1730 includes a file and folder list portion 1732 that lists the matching (e.g., suggested) files and the matching (e.g., suggested) folder. A user can select one or more of the matching files to attach to the draft electronic communication and the user can select the matching folder to cause the attachment interface 1730 to display contents of the selected folder.

The attachment interface 1730 also includes a browse interface control 1734 that enables a user to navigate a directory structure of a storage device to locate a file to attach. The attachment interface 1730 further includes an insert interface control 1738 that enables a user to attach a selected file to the draft electronic communication and a cancel interface control 1740 that enables a user to close the attachment interface 1730 without attaching a file to the draft electronic communication.

Figure 18:
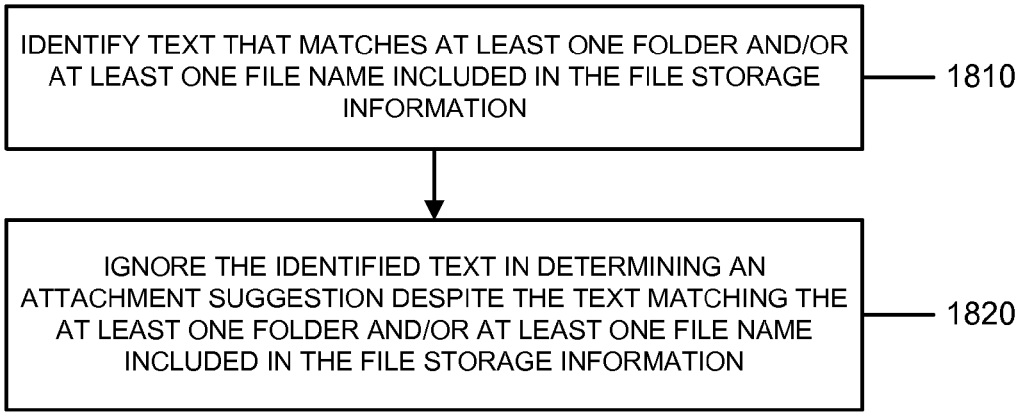

FIG. 18 illustrates an example of a process 1800 for ignoring matching folders and/or file names in determining an attachment suggestion. The system 200 identifies text that matches at least one folder and/or at least one file name included in the file storage information (1810). For example, the system 200 uses any of the techniques described throughout this disclosure to identify text in an electronic communication that matches a folder or a file name included in file storage information.

The system 200 ignores the identified text in determining an attachment suggestion despite the text matching the at least one folder and/or at least one file name included in the file storage information (1820). For instance, the system 200 may maintain a list of items of text (e.g., words or phrases) or a list of folder and file names to ignore in determining attachment suggestions. The list of items of text (e.g., words or phrases) may include lists of words, letters, or numbers that are common and frequently appear in folder and file names (e.g., the word "My" or "C"). The list of folder and file names to ignore may include folders that are not likely sources of attachments, such as a "Program Files" folder that stores system files and a "Root" directory folder that includes a vast amount of information.

In some examples, the system 200 may ignore an item of text that is less than a certain length (e.g., three characters or less). In these examples, the system 200 may ignore short or preposition words that may be included in file or folder names, but do not convey a great deal of information (e.g., "I", "an", "the", etc.).

Figure 19:
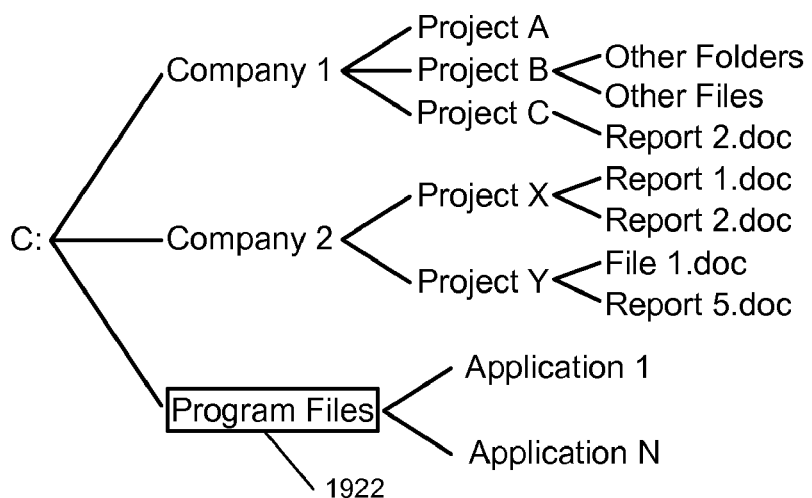

FIG. 19 illustrates an example 1900 of determining whether to provide an attachment suggestion based on comparing content of a draft electronic communication with file storage information. In the example 1900, the system 200 causes display of a communication interface 1910 of a draft electronic communication. The draft electronic communication includes an item of text 1912 in the body field.

The system 200 also includes a storage device from which a file may be attached to the draft electronic communication and that has file storage information 1920. The system 200 compares content from the draft electronic communication (e.g., the item of text 1912 and the other text in the draft electronic communication) with the file storage information 1920. In the example 1900, the system 200 compares the item of text 1912 with the file storage information 1920. In the example 1900, the comparison of the item of text 1912 (e.g., Program Files) with the file storage information 1920 results in a single folder match 1922. However, the system 200 determines to ignore the single folder match 1922 and determines not to provide an attachment suggestion based on the single folder match 1922. The system 200 makes the determination based on characteristics of the single folder match 1922. Specifically, the system 200 determines that the single folder match is a standard folder in many computer systems and stores important application program files, which are very rarely the subject of an attachment to an electronic communication. Accordingly, in the example 1900, the system 200 determines to ignore the single folder match 1922 and does not provide an attachment suggestion, even though the text defining the electronic communication matches a folder in the file storage information 1920.

Figure 20:
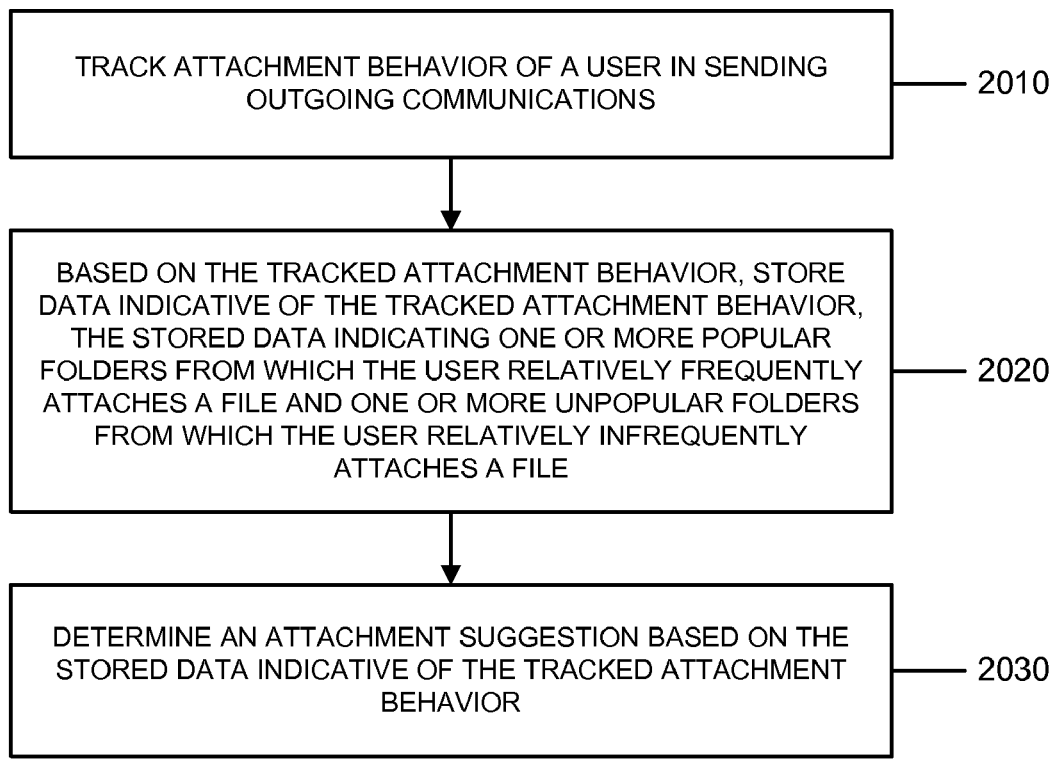

FIG. 20 illustrates an example of a process 2000 for determining an attachment suggestion based on tracked attachment behavior. The system 200 tracks attachment behavior of a user in sending outgoing communications (2010). For instance, the system 200 identifies files that a user attaches to communications and derives data related to the attached files. The derived data may include the name of the attached file, a folder in which the attached file was stored, a type of the attached file, a recipient of the electronic communication to which the file was attached, content from the electronic communication to which the file was attached, and a time when the file was attached.

The system 500 may store the derived data indicating the name of the attached file, a folder in which the attached file was stored, a type of the attached file, a recipient of the electronic communication to which the file was attached, content from the electronic communication to which the file was attached, and a time when the file was attached. The system 500 may store the data in an attached files log and the system 500 may analyze the stored data to identify patterns related to attachment behavior. The identified patterns may be used to inform attachment suggestions.

In some implementations, the identified patterns may be determined using a statistical analysis of the data stored in the attached files log. In these implementations, the system 200 may determine folders from which the user relatively frequently attaches files and folders from which the user relatively infrequently attaches files. The system 200 also may identify types of files that are typically attached to communications sent to particular users. The system 200 further may identify types of files that are typically attached to communications during particular time periods.

Based on the tracked attachment behavior, the system 200 stores data indicative of the tracked attachment behavior (2020). The stored data may indicate one or more popular folders from which the user relatively frequently attaches a file and one or more unpopular folders from which the user relatively infrequently attaches a file. The system 200 may use the data stored in tracking attachment behavior and statistical analysis of the tracked data to store data indicative of attachment rates, attachment recipients, and attachment patterns.

For example, the system 200 analyzes tracked attachment data and identifies attachment patterns for particular recipients, storage locations, types of files, or time periods or combinations of the same. In this example, the system 200 may analyze data included in an attached files log maintained by the system 200 over a period of time. The analyzed attached files log includes comprehensive data related to past attachments to communications sent by a user.

In some implementations, the system 200 determines an attachment pattern for a particular recipient, a particular folder location, a particular type of communication, and/or a particular time period of attachments made by the user in the past. In these implementations, the system 200 identifies and accesses data tracking attachments to communications having the particular recipient, being made from the particular folder location, being the particular type of communication, and/or being made during the particular time period. Using the tracked attachment data, the system 200 identifies patterns of the user's past attachment behavior for sent communications having the particular recipient, the particular folder location, the particular type of communication, and/or the particular time period.

In some implementations, the system 200 determines time of day/day of week/date attachment timing patterns of the user for communications of the particular recipient, the particular folder location, the particular type of communication, and/or the particular time period using the tracked attachment data. For instance, the system 200 may identify each instance in the tracked attachment data where the user attached a file to a communication being sent to the particular recipient, being of the particular type of communication, being sent during the particular time period, and the file being from a particular storage location (e.g., folder). For each identified instance, the system 200 may, using the tracked attachment data, determine a time of day and a day of the week when the user attached a file to the communication. Using the determined time of day and day of the week, the system 200 may identify time of day and day of week attachment patterns of the user for communications with the particular recipient, the particular type of communication, and/or the particular time period in the past. For example, the system 500 may determine that 90% of the user's past communications sent to the particular recipient, the particular type of communication, and/or the particular time period in the past have occurred between the hours of 10 PM to 11 PM.

The system 500 may update the attachment pattern data periodically or each time the user responds to a new communication. In some examples, the system 500 keeps running totals of communication information (e.g., total number of attached files) and updates the attachment pattern data each time a new communication is received and/or each time a response communication is sent.

The system 200 determines an attachment suggestion based on the stored data indicative of the tracked attachment behavior (2030). For example, the system 200 may use attachment rates associated with folders to determine attachment suggestions. In this example, the system 200 may analyze attachment rates for folders matching content (e.g., text) in an electronic communication or folders storing file names matching content (e.g., text) in an electronic communication and determine which of the matching folders and/or matching files to suggest based on the comparison. For instance, the system 200 may remove matching folders that have relatively low attachment rates (e.g., an attachment rate that indicates that the folder has not previously been a source of an attached file) from the attachment suggestion.

The system 200 also may rank or score matching folders and/or files based on the attachment rates. For instance, when a first file otherwise has a first score that is the same as a second score of a second file, the first file may be ranked or scored higher than the second file when the first file is located in a first folder that is typically a source of attached files and the second file is located in a second folder that is not typically a source of attached files. A weighting factor that corresponds to past attachment rate may be applied to all files and/or folders that are being considered as part of an attachment suggestion.

In some implementations, the system 200 may compare attributes of an electronic communication being defined to the tracked attachment behavior data. In these implementations, the system 200 may compare the recipient of an electronic communication to the tracked attachment behavior data. When the system 200 determines that a pattern of past attachment behavior exists for the recipient of the electronic communication, the system 200 may account for the pattern of past attachment behavior in suggesting an attachment. For example, the system 200 may identify a pattern of past attachment behavior that indicates that attachments to electronic communications sent to the recipient typically are located within a particular folder. In this example, the particular folder and/or files stored in the particular folder may be given a relatively high weight in determining an attachment suggestion for the electronic communication.

The system 200 also may compare the date, time, and/or day of week of sending an electronic communication to the tracked attachment behavior data. When the system 200 determines that a pattern of past attachment behavior exists for the date, time, and/or day of week of sending the electronic communication, the system 200 may account for the pattern of past attachment behavior in suggesting an attachment. For example, the system 200 may identify a pattern of past attachment behavior that indicates that attachments to electronic communications sent at the date, time, and/or day of week typically are located within a particular folder. In this example, the particular folder and/or files stored in the particular folder may be given a relatively high weight in determining an attachment suggestion for the electronic communication.

FIG. 21 illustrates an example data structure 2100 that includes tracked attachment behavior data for multiple folders in an electronic storage device. The data structure 2100 includes a first column 2110 that indicates a folder, a second column 2120 that indicates an attachment rate corresponding to the folder in the first column 2110, a third column 2130 that indicates one or more recipients included in an electronic communication that was sent, and a fourth column 2140 that indicates a date and/or a time when an attachment is typically selected from the corresponding folder. The data structure 2100 that includes tracked attachment behavior data may be used to inform attachment suggestion and identify appropriate files and folders to suggest.

The first through fourth rows 2150, 2152, 2154, and 2156 indicate that a file organized in the folders listed in the first through fourth rows 2150, 2152, 2154, and 2156 has never been used as an attachment to an electronic communication. Accordingly, the system 200 may not suggest the folders listed in the first through fourth rows 2150, 2152, 2154, and 2156 or any files listed in the folders listed in the first through fourth rows 2150, 2152, 2154, and 2156, even though the folders or files match content defining an electronic communication.

The fifth row 2158 indicates that the folder "Company 1" has been a source of an attached file forty percent of the time, the electronic communications including an attached file from the folder "Company 1" have all been addressed to "User 1," and that the electronic communications including an attached file from the folder "Company 1" typically (e.g., all or a relatively high percentage) have been sent between Monday and Friday and between the hours 8 AM to 6 PM. As such, the folder "Company 1" may be relatively highly weighted for an attachment suggestion when an electronic communication is being sent to "User 1" between Monday and Friday and between the hours 8 AM to 6 PM.

The sixth row 2160 indicates that the folder "Company 2" has been a source of an attached file thirty percent of the time, the electronic communications including an attached file from the folder "Company 2" have all been addressed to "User 2," and that the electronic communications including an attached file from the folder "Company 2" have yet to exhibit a discernible pattern. As such, the folder "Company 2"

may be relatively highly weighted for an attachment suggestion when an electronic communication is being sent to "User 2."

The seventh row 2162 indicates that the folder "Project A" has been a source of an attached file twenty percent of the time, the electronic communications including an attached file from the folder "Project A" have been addressed to either "User A" or "User B", and that the electronic communications including an attached file from the folder "Project A" have yet to exhibit a discernible pattern. As such, the folder "Project A" may be relatively highly weighted for an attachment suggestion when an electronic communication is being sent to "User A" and/or "User B."

The eighth row 2164 indicates that the folder "Project Z" has been a source of an attached file ten percent of the time, the electronic communications including an attached file from the folder "Project Z" have all been addressed to one or more users included in "User Group Z", and that the electronic communications including an attached file from the folder "Project Z" typically (e.g., all or a relatively high percentage) have been sent on Saturday or Sunday. As such, the folder "Project Z" may be relatively highly weighted for an attachment suggestion when an electronic communication is being sent to "User Group Z" on Saturday or Sunday.

Figure 22:
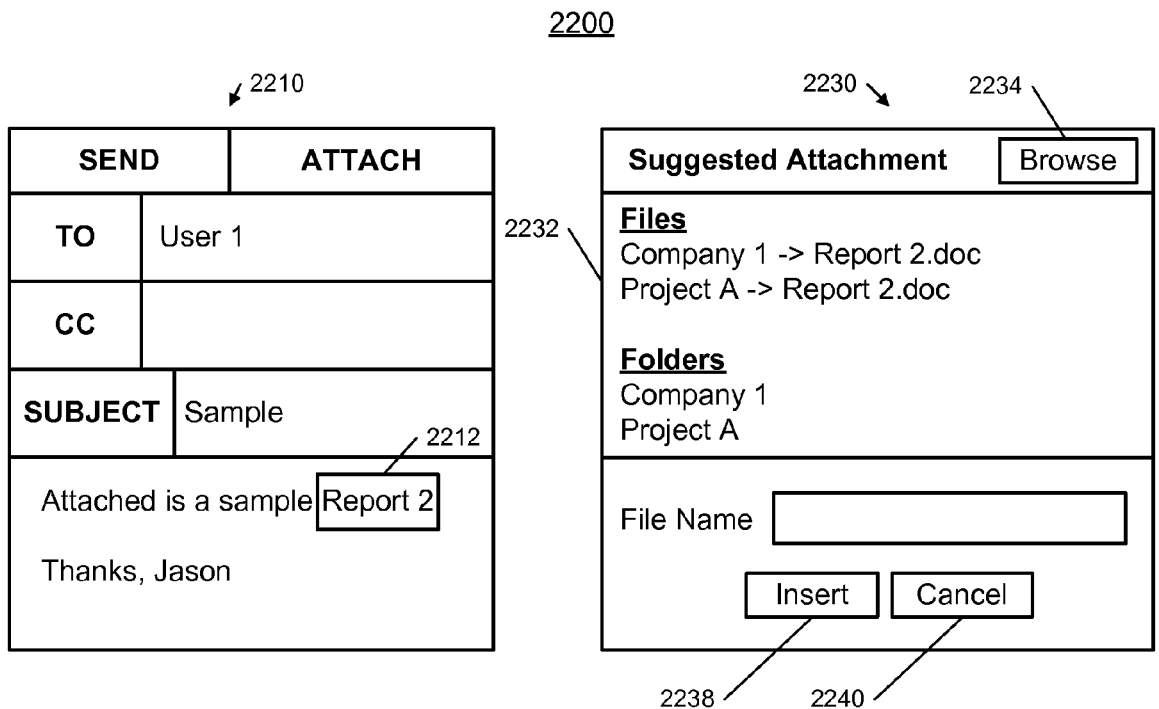
Figure 22:
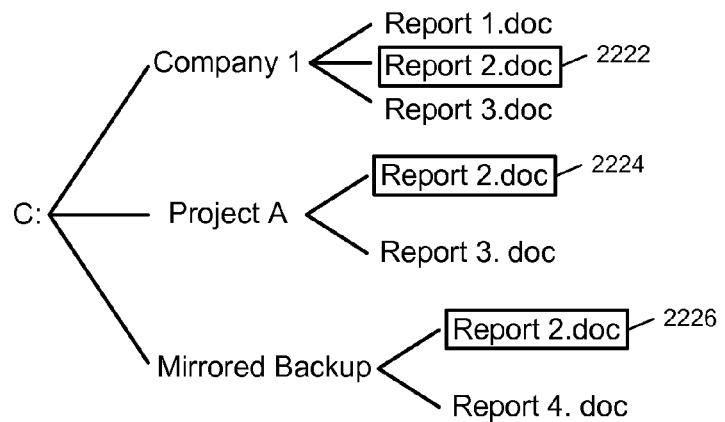

FIG. 22 illustrates an example 2200 of an attachment suggestion provided based on comparing content of a draft electronic communication with file storage information and analyzing past attachment behavior. In the example 2200, the system 200 causes display of a communication interface 2210 of a draft electronic communication. The draft electronic communication includes an item of text 2212 in the body field.

The system 200 also includes a storage device from which a file may be attached to the draft electronic communication and that has file storage information 2220. The system 200 compares content from the draft electronic communication (e.g., the item of text 2212 and the other text in the draft electronic communication) with the file storage information 2220. In the example 2200, the system 200 determines that the item of text 2212 matches files 2222, 2224, and 2226 included in the file storage information 2220. Based on the determination, the system 200 identifies the files 2222, 2224, and 2226 as possible files to suggest for an attachment.

In the example 2200, the system 200 performs additional processing on the files 2222, 2224, and 2226 using tracked attachment behavior data. Specifically, the system 200 uses the tracked attachment behavior data in the data structure 2100 shown in FIG. 21 to provide an attachment suggestion. The files 2222, 2224, and 2226 are organized in folders that correspond to rows 2158, 2162, and 2150, respectively. As such, the system 200 accesses the tracked attachment behavior data stored in the rows 2158, 2162, and 2150 and determines an attachment suggestion based on the matching files 2222, 2224, and 2226 and the tracked attachment behavior data stored in the rows 2158, 2162, and 2150. In this case, the system 200 determines not to include the matching file 2226 in the attachment suggestion because the folder in which the file 2226 is organized has never been a source of an attached file in the past.

Because the tracked attachment behavior data indicates that the folders in which the files 2222 and 2224 are organized have each been a source of an attached file in the past, the system 200 determines to suggest the files 2222 and 2224. The system 200 determines to arrange the file 2222 prior to the file 2224 because the draft electronic communication is addressed to "User 1" and "User 1" is typically a recipient of communications that include an attached file from the folder "Company 1" in which the file 2222 is located.

The system 200 displays the attachment interface 2230 when the system 200 receives input activating an attach control in the communication interface 2210. In the example 2200, the attachment interface 2230 includes a file and folder list portion 2232 that lists the matching (e.g., suggested) files 2222 and 2224 and the matching (e.g., suggested) folders in which the files 2222 and 2224 are organized. A user can select one or more of the matching files 2222 and 2224 to attach to the draft electronic communication and the user can select one of the matching folders to cause the attachment interface 2230 to display contents of the selected folder.

The attachment interface 2230 also includes a browse interface control 2234 that enables a user to navigate a directory structure of a storage device to locate a file to attach. The attachment interface 2230 further includes an insert interface control 2238 that enables a user to attach a selected file to the draft electronic communication and a cancel interface control 2240 that enables a user to close the attachment interface 2230 without attaching a file to the draft electronic communication.

Figure 23:
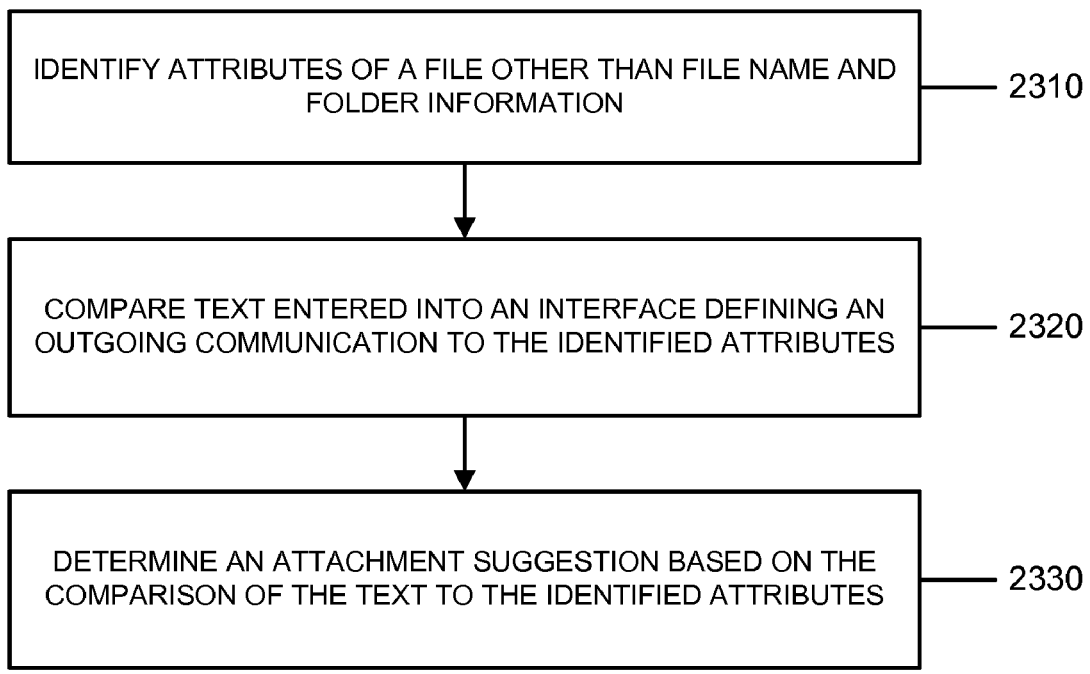

FIG. 23 illustrates an example of a process 2300 for determining an attachment suggestion based on file attributes other than file name and folder information. The system 200 identifies attributes of a file other than file name and folder information (2310). The system 200 may identify any type of attribute or metadata associated with files stored on a storage device that is accessible to the system 200. For instance, the identified attributes may include an author attribute that identifies a user that authored or created a file, a last edited attribute that identifies a user that edited a file most recently, date information that indicates when a file was created or when a file was last edited by a user.

The system 200 compares text entered into an interface defining an outgoing communication to the identified attributes (2320). For instance, the system 200 compares the text inputted to define the electronic communication to the identified attributes (e.g., file author name). The system 200 may compare all of the entered content (e.g., text) to the identified attributes or may compare only the entered content (e.g., text) from particular fields of the electronic communication (e.g., only the sender or recipient field).

The system 200 determines an attachment suggestion based on the comparison of the text to the identified attributes (2330). For instance, the system 200 determines whether the identified attributes of one or more files and/or one or more folders match any of the text (e.g., items of text or words/phrases/numbers) inputted to define the electronic communication. When the identified attributes match, the system 200 may include the corresponding file or folder as a suggested file or folder or may positively impact a score or weight associated with the file or folder.

Figure 24:
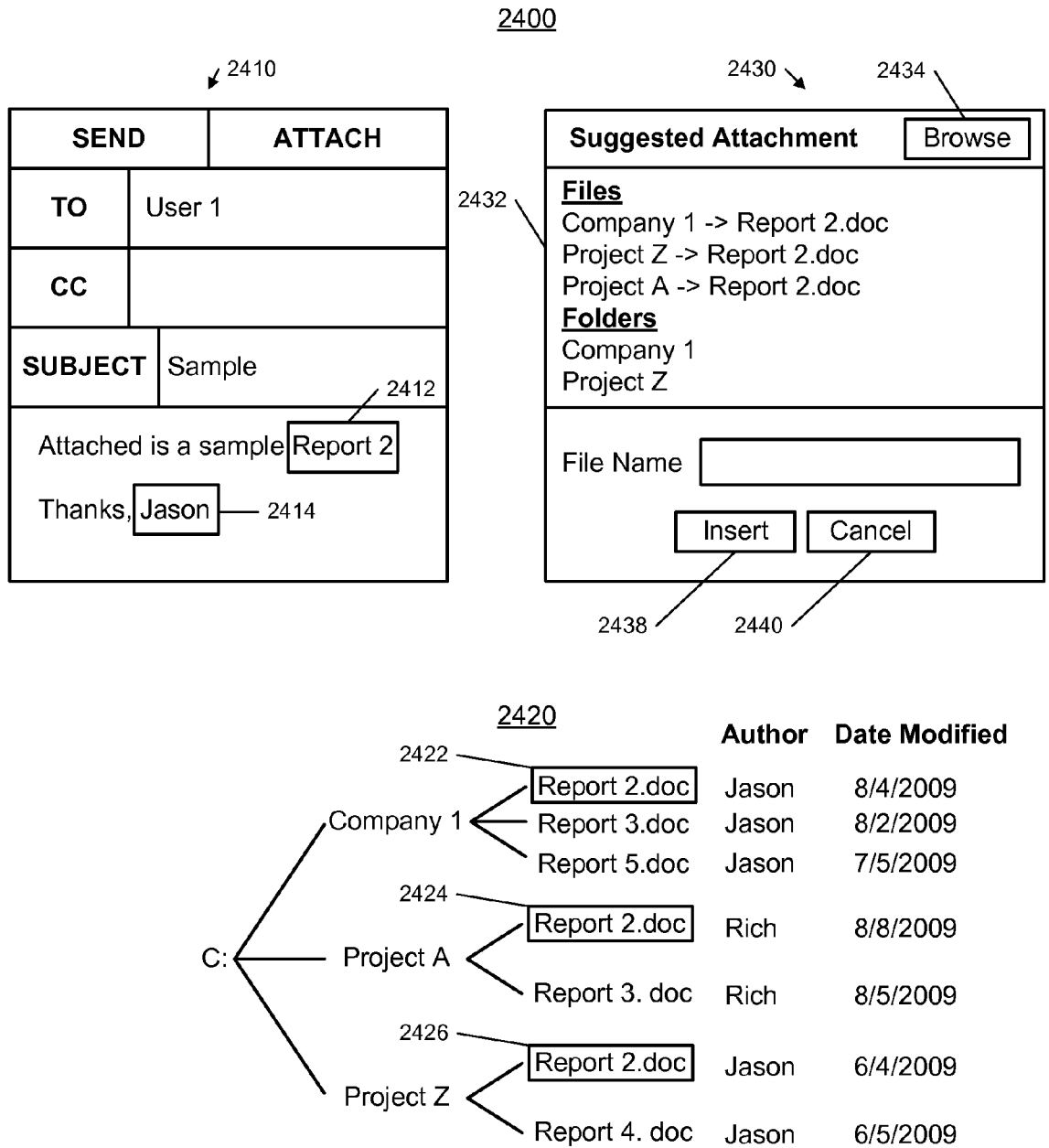

FIG. 24 illustrates an example 2400 of an attachment suggestion provided based on comparing content of a draft electronic communication with file storage information. In the example 2400, the system 200 causes display of a communication interface 2410 of a draft electronic communication. The draft electronic communication includes an item of text 2412 in the body field and an item of text 2414 in the body field.

The system 200 also includes a storage device from which a file may be attached to the draft electronic communication and that has file storage information 2420. The system 200 compares content from the draft electronic communication (e.g., the item of text 2412, the item of text 2414, and the other text in the draft electronic communication) with the file storage information 2420. In the example 2400, the system 200 determines that the item of text 2412 matches files 2422, 2424, and 2426 included in the file storage information 2420. Based on the determination, the system 200 identifies the files 2422, 2424, and 2426 as files to suggest for an attachment.

In the example 2400, the system 200 performs additional processing on attributes of the files 2422, 2424, and 2426 to determine an order of ranking the files. In some implementations, the additional processing may be used to identify a subset of files to suggest when all of the matching files cannot be suggested (e.g., due to limitations in display size). For the additional processing, the system 200 determines that the item of text 2414 is positioned in a location of a body field of an electronic communication that often corresponds to a name of the person sending the electronic communication. Based on the determination, the system 200 compares the item of text 2414 to the author attribute of the matching files 2422, 2424, and 2426 and, based on the comparison, determines that the item of text 2414 matches the author attribute of the files 2422 and 2426, but does not match the author attribute of the file 2424. Accordingly, the system 200 determines to rank the file 2424 below the files 2422 and 2426 and, therefore, the file 2424 is displayed last in the list of suggested files despite matching the item of text 2412 and having the most recent modification date.

For the files 2422 and 2426, the system 200 determines that the files 2422 and 2426 are ranked equally based on comparison of content of the draft electronic communication to the file name and author attribute of the files 2422 and 2426, so the system 200 determines to analyze the "Date Modified" attribute of the files 2422 and 2426. In particular, the system 200 accesses the last modification date data for each of the files 2422 and 2426, compares the accessed data, and determines that the file 2422 was modified more recently than the file 2426. Based on the determination that the file 2422 was modified more recently than the file 2426, the system 200 determines to rank the file 2422 above the file 2426 and, therefore, the file 2422 is displayed first in the list of suggested files.

For suggested folders, the system 200 starts with the folder in which each of the matching files 2422, 2424, and 2426 is stored. Specifically, the system 200 starts with the folders "Company 1," "Project A," and "Project Z." Because three matching folders exist and the system 200 can only display two folders in the suggested folders list, the system 200 performs additional processing on attributes of files within the matching folders to determine which two out of three folders to include in the suggested folders list. Similar to the process used to rank the file 2424 last in the suggested files list, the system 200 uses similar techniques to determine not to include the folder "Project A," which stores the file 2424, in the list of suggested folders. In addition, similar to the process used to rank the file 2422 higher than the file 2426, the system 200 uses similar techniques to determine to rank the folder "Company 1" higher than the folder "Project Z" in the list of suggested folders.

The system 200 displays the attachment interface 2430 when the system 200 receives input activating an attach control in the communication interface 2410. In the example 2400, the attachment interface 2430 includes a file and folder list portion 2432 that lists the matching (e.g., suggested) files 2422, 2424, and 2426 and the matching (e.g., suggested) folders in which the files 2422 and 2426 are organized. A user can select one or more of the matching files 2422, 2424, and 2426 to attach to the draft electronic communication and the user can select one of the matching folders to cause the attachment interface 2430 to display contents of the selected folder.

The attachment interface 2430 also includes a browse interface control 2434 that enables a user to navigate a directory structure of a storage device to locate a file to attach. The attachment interface 2430 further includes an insert interface control 2438 that enables a user to attach a selected file to the draft electronic communication and a cancel interface control 2440 that enables a user to close the attachment interface 2430 without attaching a file to the draft electronic communication.

Figure 25:
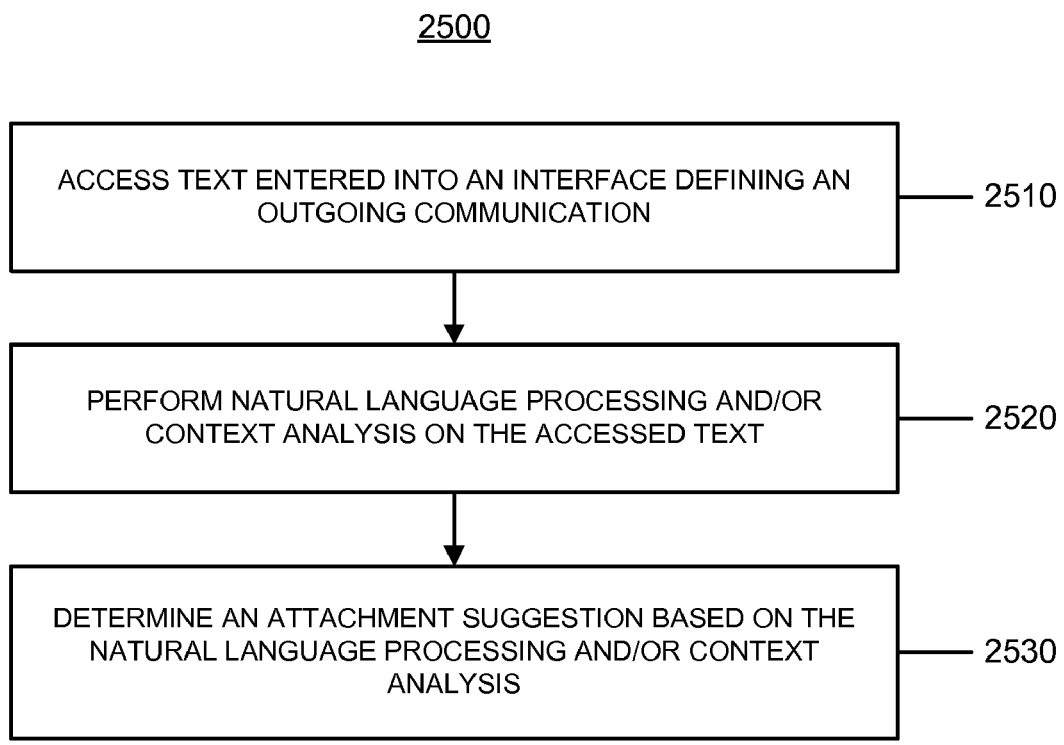

FIG. 25 illustrates an example of a process 2500 for determining an attachment suggestion based on natural language processing and/or context analysis. The system 200 accesses text entered into an interface defining an outgoing communication (2510). For instance, the system 200 receives input from a keyboard being used by a user to type text defining an electronic communication. The text input may be received using any type of input device, such as a keyboard, a keypad, a microphone, a mouse, a touch screen, etc.

The system 200 performs natural language processing and/or context analysis on the accessed text (2520). For example, the system 200 may use any type of natural language processing and/or context analysis techniques to attempt to understand a meaning of the accessed text defining the electronic communication. In this example, the understood meaning of the accessed text defining the electronic communication may be used to identify folders and/or files that correspond to the accessed text defining the electronic communication. The understood meaning of the accessed text defining the electronic communication may be used to rank or score folders and/or files that match the accessed text defining the electronic communication.

The system 200 determines an attachment suggestion based on the natural language processing and/or context analysis (2530). For instance, the system 200 determines whether the natural language processing and/or context analysis suggests that any of the text (e.g., items of text or words/phrases/numbers) inputted to define the electronic communication corresponds to one or more folders and/or one or more files included in file storage information. When the natural language processing and/or context analysis indicates that the accessed text corresponds to one or more folders and/or one or more files, the system 200 may include the corresponding folders and/or files as suggested folders and/or files or may positively impact a score or weight associated with the folders and/or files.

Figure 26:
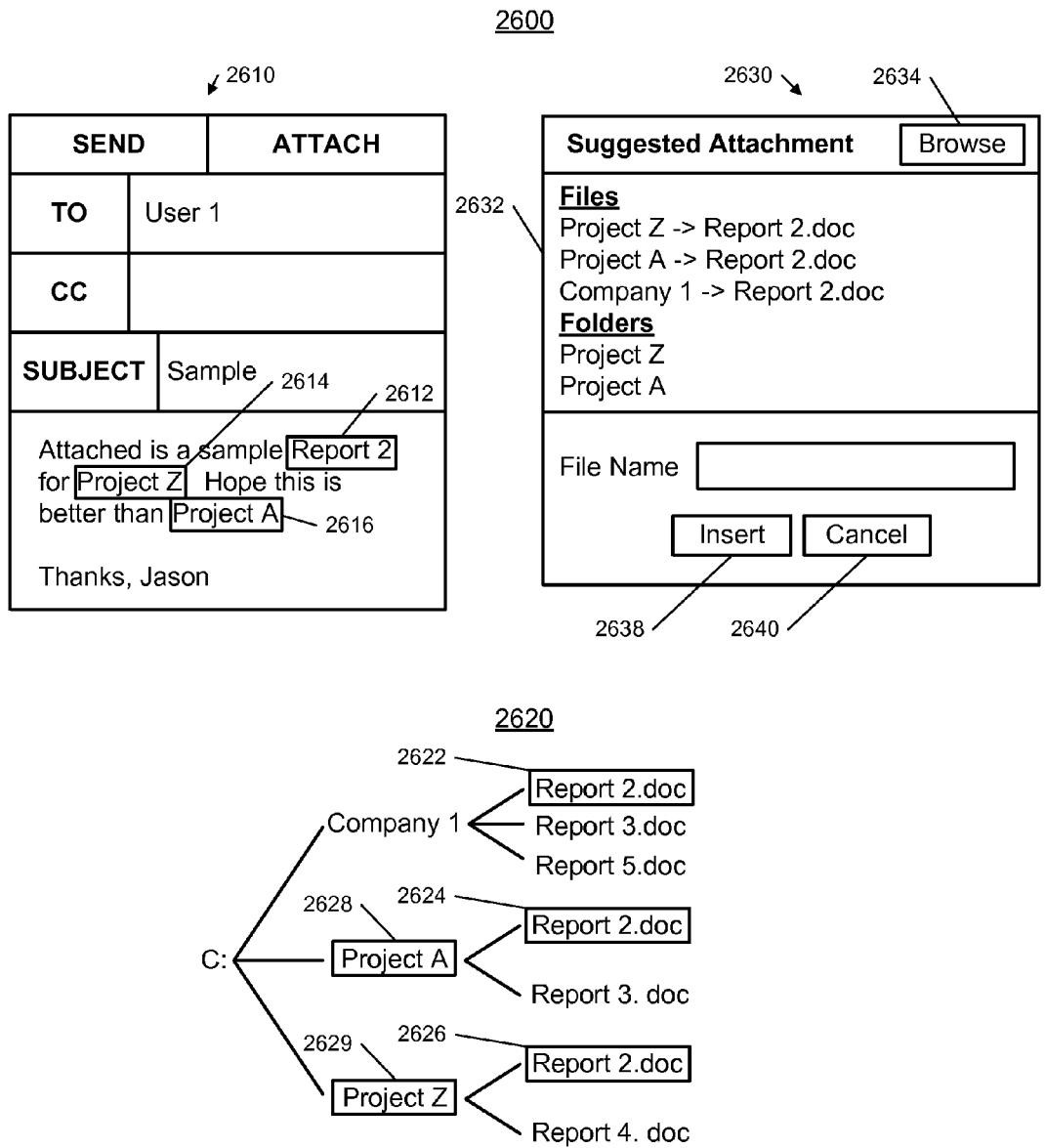

FIG. 26 illustrates an example 2600 of an attachment suggestion provided based on natural language processing and/or context analysis. In the example 2600, the system 200 causes display of a communication interface 2610 of a draft electronic communication. The draft electronic communication includes an item of text 2612 in the body field, an item of text 2614 in the body field, and an item of text 2616 in the body field.

The system 200 also includes a storage device from which a file may be attached to the draft electronic communication and that has file storage information 2620. The system 200 compares content from the draft electronic communication (e.g., the item of text 2612, the item of text 2614, the item of text 2616, and the other text in the draft electronic communication) with the file storage information 2620. In the example 2600, the system 200 determines that the item of text 2612 matches files 2622, 2624, and 2626 included in the file storage information 2620. The system 200 also determines that the item of text 2614 matches the folder 2629 included in the file storage information 2620. The system 200 further determines that the item of text 2616 matches the folder 2628 included in the file storage information 2620. Based on the determinations, the system 200 identifies the files 2622, 2624, and 2626 as files to suggest for an attachment and the folders 2628 and 2629 as folders to suggest for an attachment.

In the example 2600, the system 200 performs additional natural language processing and context analysis to determine which items of text to focus on (or provide a higher weight to) in suggesting an attachment. The natural language processing and context analysis may be used to identify a subset of files or folders to suggest when all of the matching files and folders cannot be suggested (e.g., due to limitations in display size). The natural language processing and context analysis also may be used to determine an order or ranking for the matching files and folders.

In the example 2600, the system 200 analyzes the word placing (relative and absolute) of the items of text in the body field and also the context of nearby (e.g., adjacent) words to items of text under consideration. In the example 2600, the system 200 determines that the item of text 2614 is relatively closer to the item of text 2612 than the item of text 2616. In addition, the system 200 determines that the item of text 2612 is linked to the item of text 2614 by the word "for" and that the item of text 2616 is preceded by the phrase "better than." Based on these determinations, the system 200 concludes that the item of text 2612 is more closely linked to the item of text 2614 than the item of text 2616. As such, the system 200 determines to weight the item of text 2614 higher than the item of text 2616 in performing attachment suggestion based on the natural language processing and context analysis.

In ranking the matching files 2622, 2624, and 2626, the system 200 determines to rank the file 2622 last because it is not located in a folder that matches content from the draft electronic communication and each of the files 2624 and 2626 are located in a folder that matches content from the draft electronic communication. To determine a ranking between the files 2624 and 2626, the system 200 uses the natural language processing and context analysis results discussed above. Specifically, because the system 200 determined to weight the item of text 2614 higher than the item of text 2616 in performing attachment suggestion, the system 200 determines to rank the file 2626 higher than the file 2624 because the file 2626 is located in a folder that matches an item of text that has a higher weight. In addition, for similar reasons, the system 200 determines to rank the folder 2629 higher than the folder 2628 in providing an attachment suggestion.

The system 200 displays the attachment interface 2630 when the system 200 receives input activating an attach control in the communication interface 2610. In the example 2600, the attachment interface 2630 includes a file and folder list portion 2632 that lists the matching (e.g., suggested) files 2622, 2624, and 2626 and the matching (e.g., suggested) folders in which the files 2622 and 2626 are organized. A user can select one or more of the matching files 2622, 2624, and 2626 to attach to the draft electronic communication and the user can select one of the matching folders to cause the attachment interface 2630 to display contents of the selected folder.

The attachment interface 2630 also includes a browse interface control 2634 that enables a user to navigate a directory structure of a storage device to locate a file to attach. The attachment interface 2630 further includes an insert interface control 2638 that enables a user to attach a selected file to the draft electronic communication and a cancel interface control 2640 that enables a user to close the attachment interface 2630 without attaching a file to the draft electronic communication.

Figure 27:
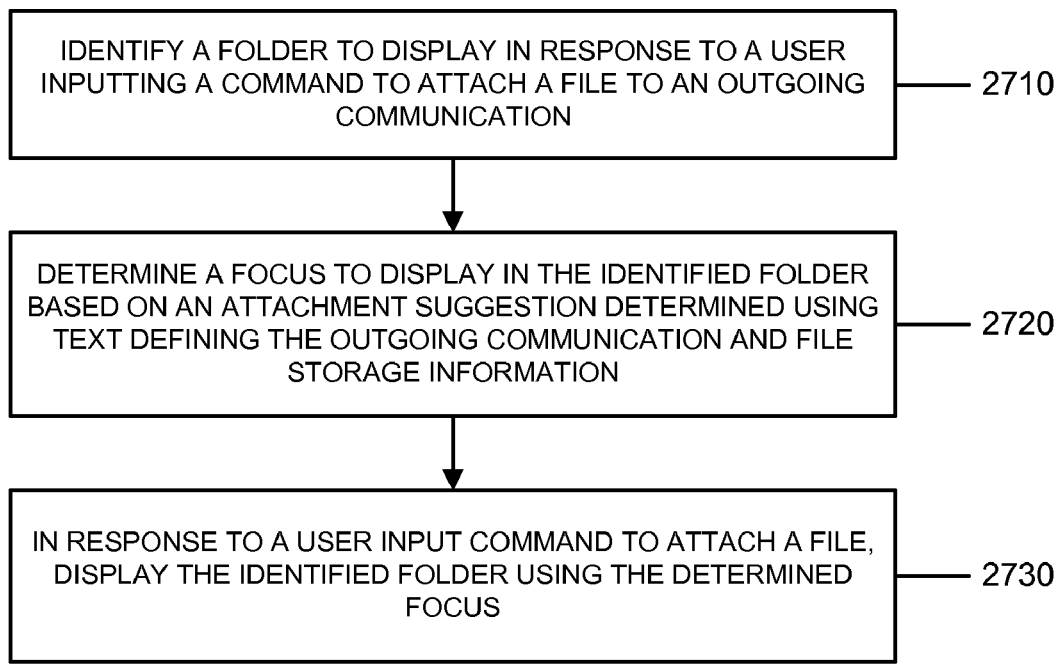

FIG. 27 illustrates an example of a process 2700 for determining an attachment suggestion based on file attributes other than file name and folder information. The system 200 identifies a folder to display in response to a user inputting a command to attach a file to an outgoing communication (2710). For instance, the system 200 may identify a default folder to display or may identify a suggested folder that the system 200 determines to suggest using any of the techniques described throughout this disclosure. Any technique to identify a folder to display may be used.

The system 200 determines a focus to display in the identified folder based on an attachment suggestion determined using text defining the outgoing communication and file storage information (2720). For example, the system 200 identifies file names included in the identified folder and determines whether any of the identified file names should be suggested using any of the techniques to suggest files described throughout this disclosure. In this example, when a file name to suggest is identified, the system 200 determines that the suggested file name should be the focus of the displayed folder contents. To focus on the suggested file name, the system 200 may define an interface display for the folder that centers on a representation of the suggested file name. When multiple file names to suggest are identified, the system 200 determines which of the files has a highest rank (e.g., a highest score or degree of confidence in match) and focuses on the file having the highest rank. When a file name to suggest is not identified, the system 200 determines a default focus to use for the displayed folder contents.

In response to a user input command to attach a file, the system 200 displays the identified folder using the determined focus (2730). For example, the system 200 displays contents of the identified folder using the determined focus. In this example, the system 200 may display representations of a subset of files included in the identified folder and the subset of files may be files that center on a file to suggest. The system 200 may display the folder contents at a top portion of the folder, a middle portion of the folder, or at an end portion of the folder depending on the determined focus.

Figure 28:
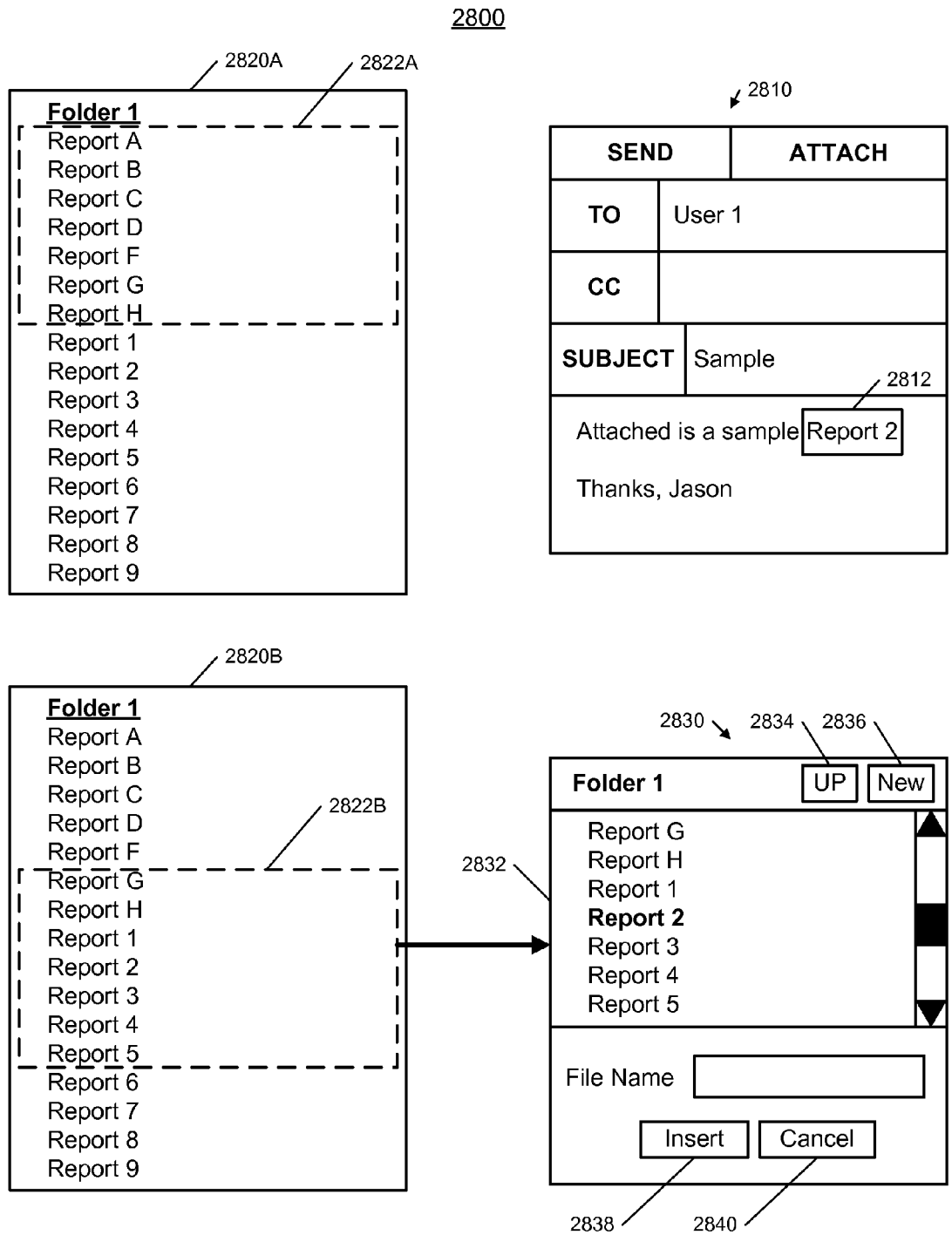

FIG. 28 illustrates an example 2800 of an attachment suggestion provided based on comparing content of a draft electronic communication with file storage information. In the example 2800, the system 200 causes display of a communication interface 2810 of a draft electronic communication. The draft electronic communication includes an item of text 2812 in the body field.

In the example 2800, the system 200 identifies a folder (i.e., Folder 1) as a folder to display when a user activates an attach control in the communication interface 2810. The system 200 may identify the folder (i.e., Folder 1) using any type of technique. For instance, the folder (i.e., Folder 1) may be a default folder or the folder from which a file was selected in the most recent attachment operation. The folder (i.e., Folder 1) also may have been selected as a suggested folder using any of the techniques described throughout this disclosure.

When a user activates an attach control in the communication interface 2810, the system 200 determines that, due to the number of files located in the folder (i.e., Folder 1), representations of all of the files cannot be displayed to a user at once in an attachment interface. Accordingly, based on the determination that representations of all of the files cannot be displayed to a user at once, the system 200 attempts to identify a subset of files that are most likely to be appropriate and focuses on those files when initially displaying an attachment interface.

For example, the system 200 compares content from the draft electronic communication (e.g., the item of text 2812 and the other text in the draft electronic communication) with the file names included in the folder (i.e., Folder 1). In the example 2800, the system 200 determines that the item of text 2812 matches the file name "Report 2" in the folder (i.e., Folder 1). Based on the determination that the item of text 2812 matches the file name "Report 2" in the folder (i.e., Folder 1), the system 200 determines to focus on the file name "Report 2" when displaying the folder (i.e., Folder 1) in an attachment interface.

The region 2822A shows a region of the folder (i.e., Folder 1) that would be displayed by default without any consideration of content included in the draft electronic communication. The region 2822B shows a region of the folder (i.e., Folder 1) that is displayed when displaying the folder (i.e., Folder 1) with a focus on the file name "Report 2." Specifically, the region 2822B is centered on the file name "Report 2."

The system 200 displays the attachment interface 2830 when the system 200 receives input activating an attach control in the communication interface 2810. The attachment interface 2830 includes a file and folder list portion 2832 that lists file names and folder names included in the folder (i.e., Folder 1). As shown, the file and folder list portion 2832 is focused on the file name "Report 2" when initially displayed. By focusing on the file name "Report 2," which was determined to be the most likely appropriate file, the system 200 may enhance a user's convenience because the most likely appropriate file is displayed directly to the user without the user having the scroll through many, different files in trying to locate it. The file name "Report 2" also may be distinguished in the interface (e.g., bolded) from other file names, which may further enhance a user's ability to locate it. The attachment interface 2830 includes a scroll bar control that enables a user to view other files in the folder (i.e., Folder 1).

The attachment interface 2830 also includes an up interface control 2834 that enables a user to navigate to the next higher level folder from the folder (i.e., Folder 1) and a new interface control 2836 that enables a user to create a new folder in the folder (i.e., Folder 1). The attachment interface 2830 further includes an insert interface control 2838 that enables a user to attach a selected file to the draft electronic communication and a cancel interface control 2840 that enables a user to close the attachment interface 2830 without attaching a file to the draft electronic communication.

The described systems, methods, and techniques may be implemented in digital electronic circuitry, computer hardware, or in combinations of these elements and software. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of providing an attachment suggestion for an electronic communication, the method comprising:

receiving, at an electronic device, a user input command to initiate sending of an outgoing electronic communication;

in response to receiving the user input command to initiate sending of the outgoing electronic communication, causing display, on a display associated with the electronic device, of an interface that enables user entry of information defining the outgoing communication;

subsequent to causing display of the interface that enables user entry of information defining the outgoing communication, receiving, at the electronic device from a user, text corresponding to one or more input fields of the displayed interface, wherein the one or more input fields of the displayed interface comprises at least one of an address field, a subject field, or a body field in the outgoing communication;

accessing, at the electronic device, file storage information that is descriptive of files stored in electronic storage accessible to the electronic device;

comparing, by the electronic device, the received text corresponding to the one or more input fields of the displayed interface with the accessed file storage information that is descriptive of files stored in electronic storage accessible to the electronic device;

based on the comparison of the received text with the accessed file storage information, determining an attachment suggestion for the outgoing communication, the attachment suggestion including at least one of a suggested folder location and a suggested file, wherein determining the attachment suggestion for the outgoing communication comprises:

identifying a file or folder name in the accessed file storage information that includes a file storage path that matches the received text defining the outgoing communication based on the comparison of the received text with the accessed file storage information, the file storage path of the identified file or folder name matching multiple words in the received text defining the outgoing communication, computing a score for the identified file or folder name in the accessed file storage information based on a number of words in the received text defining the outgoing communication that match the file storage path of the identified file or folder name and a percentage of the file storage path that matches the received text defining the outgoing communication, and determining to suggest the identified file or folder name for the outgoing communication based on the computed score; and subsequent to determining the attachment suggestion for the outgoing communication, displaying, on the display associated with the electronic device, a representation of the determined attachment suggestion for the outgoing communication.

2. The method of claim 1 wherein the attachment suggestion includes a suggested file and displaying, on the display associated with the electronic device, the representation of the determined attachment suggestion for the outgoing communication comprises displaying the suggested file in a list of one or more suggested files for the outgoing communication.

3. The method of claim 1 wherein the attachment suggestion includes a suggested folder and displaying, on the display associated with the electronic device, the representation of the determined attachment suggestion for the outgoing communication comprises displaying a representation of the suggested folder, rather than a default folder, in response to receipt of an attach command.

4. The method of claim 1 wherein determining the attachment suggestion for the outgoing communication comprises:

determining the number of words in the received text defining the outgoing communication that match the file storage path of the identified file or folder name;

for each of the multiple words, identifying, from among at least the address field, the subject field, and the body field, a field in the outgoing communication at which the corresponding word is located;

for each of the multiple words, identifying, from among at least a folder portion and a file name portion, a portion of the file storage path that the corresponding word matches;

determining the percentage of the file storage path that matches the received text defining the outgoing communication;

computing the score for the identified file or folder name in the accessed file storage information based on the determined number of words in the received text defining the outgoing communication that match the file storage path of the identified file or folder name, the identified fields in the outgoing communication, the identified portions of the file storage path, and the determined percentage; and determining an order for the identified file or folder name in a list of suggested file or folder names for the outgoing communication based on the computed score.

5. The method of claim 1:

wherein receiving, at the electronic device, the user input command to initiate sending of the outgoing electronic communication comprises receiving, at the electronic device, a user input command to initiate sending of an additional electronic communication in a string of one or more past electronic communications;

wherein causing display, on a display associated with the electronic device, of the interface that enables user entry of information defining the outgoing communication comprises, in response to receiving the user input command to initiate sending of the additional electronic communication, causing display, on a display associated with the electronic device, of an interface that enables user entry of information defining the additional communication and that displays at least a portion of the one or more past electronic communications in the string;

wherein receiving, at the electronic device, text corresponding to one or more input fields of the displayed interface comprises receiving text entered in defining the additional communication and accessing text included in at least a portion of the one or more past electronic communications;

wherein comparing, by the electronic device, the received text corresponding to one or more input fields of the displayed interface with the accessed file storage information that is descriptive of files stored in electronic storage accessible to the electronic device comprises comparing the received text entered in defining the additional communication with the accessed file storage information and comparing the accessed text included in at least a portion of the one or more past electronic communications with the accessed file storage information; and wherein determining the attachment suggestion for the outgoing communication comprises determining an attachment suggestion for the additional communication based on the comparison of the received text entered in defining the additional communication with the accessed file storage information and the comparison of the accessed text included in at least a portion of the one or more past electronic communications with the accessed file storage information.

6. The method of claim 1 wherein determining the attachment suggestion for the outgoing communication comprises:

monitoring, by the electronic device, text entered into the one or more input fields of the displayed interface that enables user entry of information defining the outgoing communication;

based on the monitoring, identifying newly-entered text in the one or more input fields of the displayed interface that enables user entry of information defining the outgoing communication;

dynamically comparing, by the electronic device, the identified newly-entered text along with previously-entered text to the accessed file storage information; and dynamically determining an attachment suggestion for the outgoing communication based on the comparison of the newly-entered text to the accessed file storage information.

7. The method of claim 1 further comprising:

maintaining a suggested attachment interface area displayed with the interface that enables user entry of information defining the outgoing communication;

automatically, without human intervention, updating the suggested attachment interface area based on attachment suggestions dynamically determined as text is entered into the one or more input fields of the interface that enables user entry of information defining the outgoing communication;

receiving user input indicative of a desire to attach, to the outgoing communication, one or more of the suggested attachments displayed in the suggested attachment interface area; and in response to receiving the user input indicative of the desire to attach, to the outgoing communication, one or more of the suggested attachments displayed in the suggested attachment interface area, attaching the one or more suggested attachments to the outgoing communication.

8. The method of claim 7 wherein automatically, without human intervention, updating the suggested attachment interface area based on attachment suggestions dynamically determined as text is entered into the one or more input fields of the interface that enables user entry of information defining the outgoing communication comprises:

receiving first text defining a recipient of the outgoing communication;

at a first point in time, determining a first attachment suggestion for the outgoing communication based on the first text defining the recipient of the outgoing communication, the first attachment suggestion including a first set of suggested files and the only text defining the outgoing communication at the first point in time is the first text;

displaying the first attachment suggestion, including the first set of suggested files, in the suggested attachment interface area;

receiving second text defining a subject of the outgoing communication;

at a second point in time that is subsequent to the first point in time and the displaying of the first attachment suggestion, determining a second attachment suggestion for the outgoing communication based on the first text defining the recipient of the outgoing communication and the second text defining the subject of the outgoing communication, the second attachment suggestion including a second set of suggested files that is different than the first set of suggested files and the only text defining the outgoing communication at the second point in time is the first text and the second text;

updating the suggested attachment interface area to replace the display of the first attachment suggestion, including the first set of suggested files, with a display of the second attachment suggestion, including the second set of suggested files that is different than the first set of suggested files;

receiving third text defining a portion of a body of the outgoing communication;

at a third point in time that is subsequent to the first point in time, the second point in time, and the updating of the suggested attachment interface area to replace the display of the first attachment suggestion, determining a third attachment suggestion for the outgoing communication based on the first text defining the recipient of the outgoing communication, the second text defining the subject of the outgoing communication, and the third text defining the portion of the body of the outgoing communication, the third attachment suggestion including a third set of suggested files that is different than the first set of suggested files and the second set of suggested files and the only text defining the outgoing communication at the third point in time is the first text, the second text, and the third text; and updating the suggested attachment interface area to replace the display of the second attachment suggestion, including the second set of suggested files, with a display of the third attachment suggestion, including the third set of suggested files that is different than the first set of suggested files and the second set of suggested files.

9. The method of claim 8:

wherein the first set of suggested files includes a first file that is not included in the second set of suggested files, the second set of suggested files includes a second file that is not included in the first set of suggested files, and the first set of suggested files and the second set of suggested files include a common file that is found in both sets;

wherein updating the suggested attachment interface area to replace the display of the first attachment suggestion with a display of the second attachment suggestion comprises removing the first file from the suggested attachment interface area, adding the second file to the suggested attachment interface area, and maintaining the common file in the suggested attachment interface area;

wherein the third set of suggested files includes the same files as the second set of suggested files, but arranged in a different order; and wherein updating the suggested attachment interface area to replace the display of the second attachment suggestion with a display of the third attachment suggestion comprises maintaining which files are displayed in the suggested attachment interface area while updating an order of the suggested files displayed in the suggested attachment interface area.

10. The method of claim 1 further comprising:

accessing text being entered into the one or more input fields of the interface that enables user entry of information defining the outgoing communication;

comparing, by the electronic device, the accessed text to the accessed file storage information;

based on the comparison of the accessed text to the accessed file storage information, identifying, by the electronic device, one or more potential file name matches included in the accessed file storage information;

determining, for each of the identified one or more matches, a score that reflects how closely the corresponding file name matches the accessed text;

comparing each of the one or more scores for the one or more potential matches to a threshold score;

based on the comparison of the one or more scores for the one or more potential matches to the threshold score, determining whether each of the one or more scores exceeds the threshold score;

in response to a determination that a particular score included in the one or more scores for the one or more potential matches exceeds the threshold score, causing display, while text is being entered into the one or more input fields of the interface that enables user entry of information defining the outgoing communication, of an interface element suggesting the file name corresponding to the particular score as an attachment for the outgoing communication; and in response to a determination that no score included in the one or more scores for the one or more potential matches exceeds the threshold score, maintaining display of the interface that enables user entry of information defining the outgoing communication without providing an additional attachment suggestion while text is being entered into the one or more input fields of the interface that enables user entry of information defining the outgoing communication.

11. The method of claim 1 further comprising:

accessing text entered into the one or more input fields of the interface that enables user entry of information defining the outgoing communication;

determining whether to convert the accessed text in determining an attachment suggestion for the outgoing communication;

in response to a determination to convert the accessed text, converting the accessed text to modified text and determining an attachment suggestion based on the modified text; and in response to a determination not to convert the accessed text, determining an attachment suggestion for the outgoing communication based on the accessed text without conversion.

12. The method of claim 1 further comprising:

accessing text entered into the one or more input fields of the interface that enables user entry of information defining the outgoing communication;

determining whether to expand the accessed text in determining an attachment suggestion for the outgoing communication;

in response to a determination to expand the accessed text, expanding the accessed text to modified text and determining an attachment suggestion based on the modified text; and in response to a determination not to expand the accessed text, determining an attachment suggestion for the outgoing communication based on the accessed text without expansion.

13. The method of claim 1 further comprising:

identifying text, entered into the one or more input fields of the interface that enables user entry of information defining the outgoing communication, that matches at least one folder included in the accessed file storage information; and ignoring the identified text in determining an attachment suggestion for the outgoing communication despite the text matching the at least one folder included in the file storage information.

14. The method of claim 13 wherein the ignoring the identified text in determining the attachment suggestion for the outgoing communication despite the text matching the at least one folder included in the file storage information comprises determining that the identified text matches a system folder that stores system files associated with operation of the electronic device and ignoring the identified text that matches the system folder based on the determination that the identified text matches the system folder.

15. The method of claim 1 further comprising:

tracking attachment behavior of a user in sending outgoing communications;

based on the tracked attachment behavior, storing, in electronic storage, data indicative of the tracked attachment behavior, the stored data indicating one or more popular folders from which the user relatively frequently attaches a file and one or more unpopular folders from which the user relatively infrequently attaches a file; and determining an attachment suggestion for the outgoing communication based on the stored data indicative of the tracked attachment behavior.

16. The method of claim 1 further comprising:

identifying an attribute of a file other than file name and folder information, the identified attribute being an identity of a user that manipulated the file;

comparing text, entered into the one or more input fields of the interface that enables user entry of information defining the outgoing communication, to the identified attribute other than file name and folder information; and determining an attachment suggestion for the outgoing communication based on the comparison of the text to the identified attribute.

17. The method of claim 1 further comprising:

accessing text entered into the one or more input fields of the interface that enables user entry of information defining the outgoing communication;

performing natural language processing and context analysis on the accessed text; and determining an attachment suggestion based on the natural language processing and context analysis performed on the accessed text.

18. The method of claim 1 further comprising:

identifying a folder to display in response to a user inputting a command to attach a file to the outgoing communication;

determining a focus to display in the identified folder based on the determined attachment suggestion for the outgoing communication; and in response to receiving a user input command to attach a file, displaying, on the display associated with the electronic device, the identified folder using the determined focus.

19. The method of claim 18:

wherein determining the focus to display in the identified folder based on the determined attachment suggestion for the outgoing communication comprises:

identifying a particular file name that is located within the identified folder and that matches text defining the outgoing communication based on the comparison of the received text with the accessed file storage information; and determining a subset of file names to display representations of within a representation of the identified folder by causing the particular file name to be located at a center of the representation of the identified folder; and wherein displaying, on the display associated with the electronic device, the identified folder using the determined focus comprises displaying the representation of the identified folder including the representations of the subset of file names with the particular file name located at the center of the representation of the identified folder.

20. An electronic device comprising:

at least one processor; and at least one computer-readable storage medium encoded with executable instructions that, when executed by the at least one processor, causes the at least one processor to perform operations comprising:

receiving, at the electronic device, a user input command to initiate sending of an outgoing electronic communication;

in response to receiving the user input command to initiate sending of the outgoing electronic communication, causing display, on a display associated with the electronic device, of an interface that enables user entry of information defining the outgoing communication;

subsequent to causing display of the interface that enables user entry of information defining the outgoing communication, receiving, at the electronic device from a user, text corresponding to one or more input fields of the displayed interface, wherein the one or more input fields of the displayed interface comprises at least one of an address field, a subject field, or a body field in the outgoing communication;

accessing, at the electronic device, file storage information that is descriptive of files stored in electronic storage accessible to the electronic device;

comparing, by the electronic device, the received text corresponding to the one or more input fields of the displayed interface with the accessed file storage information that is descriptive of files stored in electronic storage accessible to the electronic device;

based on the comparison of the received text with the accessed file storage information, determining an attachment suggestion for the outgoing communication, the attachment suggestion including at least one of a suggested folder location and a suggested file, wherein determining the attachment suggestion for the outgoing communication comprises:

identifying a file or folder name in the accessed file storage information that includes a file storage path that matches the received text defining the outgoing communication based on the comparison of the received text with the accessed file storage information, the file storage path of the identified file or folder name matching multiple words in the received text defining the outgoing communication, computing a score for the identified file or folder name in the accessed file storage information based on a number of words in the received text defining the outgoing communication that match the file storage path of the identified file or folder name and a percentage of the file storage path that matches the received text defining the outgoing communication, and determining to suggest the identified file or folder name for the outgoing communication based on the computed score; and subsequent to determining the attachment suggestion for the outgoing communication, displaying, on the display associated with the electronic device, a representation of the determined attachment suggestion for the outgoing communication.

\* \* \* \* \*